United States Patent [19]
Suzuki

[11] Patent Number: 6,154,273
[45] Date of Patent: Nov. 28, 2000

[54] WAVELENGTH DISPERSION MEASUREMENT APPARATUS AND A METHOD THEREOF

[75] Inventor: Yasuo Suzuki, Kanagawa, Japan

[73] Assignee: Fujitsu Limited, Kawasaki, Japan

[21] Appl. No.: 09/271,252

[22] Filed: Mar. 17, 1999

[30] Foreign Application Priority Data

Jun. 30, 1998 [JP] Japan ................................. 10-184088

[51] Int. Cl.$^7$ .................................................. G01N 21/00
[52] U.S. Cl. .......................................................... 356/73.1
[58] Field of Search ............................. 356/73.1; 385/27, 385/24, 147, 39, 45, 46, 123, 122; 250/551, 227.18, 227.23

[56] References Cited

U.S. PATENT DOCUMENTS 5,557,694  9/1996  Veith et al. .

FOREIGN PATENT DOCUMENTS 7-336301  12/1995  Japan .

OTHER PUBLICATIONS

B. Mikkelsen, et al., Wavelength Conversion, *OFC '96 Technical Digest*, vol. 2, pp. 121–122.
National Convention Record I.E.E. Japan, Article 547, 1995.
NTT Technology Journal, vol. 9, No. 9, pp. 70–73, Sep. 1997.
"Development of Multi–media Application/Middleware", NTT Technology Journal, vol. 9, No. 9, pp. 1–13 and Figs. 1–5, Sep. 1997 (translation).
National Convention of Electric Society in 1995, National Convention Record I.E.E. Japan, Article 547, pp. 17–24 and Figs. 1–3, 1995 (translation).

*Primary Examiner*—Frank G. Font
*Assistant Examiner*—Tu T Nguyen
*Attorney, Agent, or Firm*—Staas & Halsey LLP

[57] ABSTRACT

A signal light from a variable wavelength light source and an excitation light from a variable wavelength light source are input to a fiber to be measured. At least either of the signal and the excitation lights is assigned a high power level such that a 4-wave mixing phenomenon is caused within the fiber to be measured. In this way, an FWM light occurs within the fiber to be measured. On a receiving side, the power levels of the FWM and the signal lights are measured, and the generation efficiency of the FWM light is calculated. Since the generation efficiency of the FWM light depends on the dispersion value of the fiber to be measured, the dispersion value is obtained from the generation efficiency of the FWM light by using this dependency. The measurement may be manually made by an operator, or be automatically made.

30 Claims, 16 Drawing Sheets

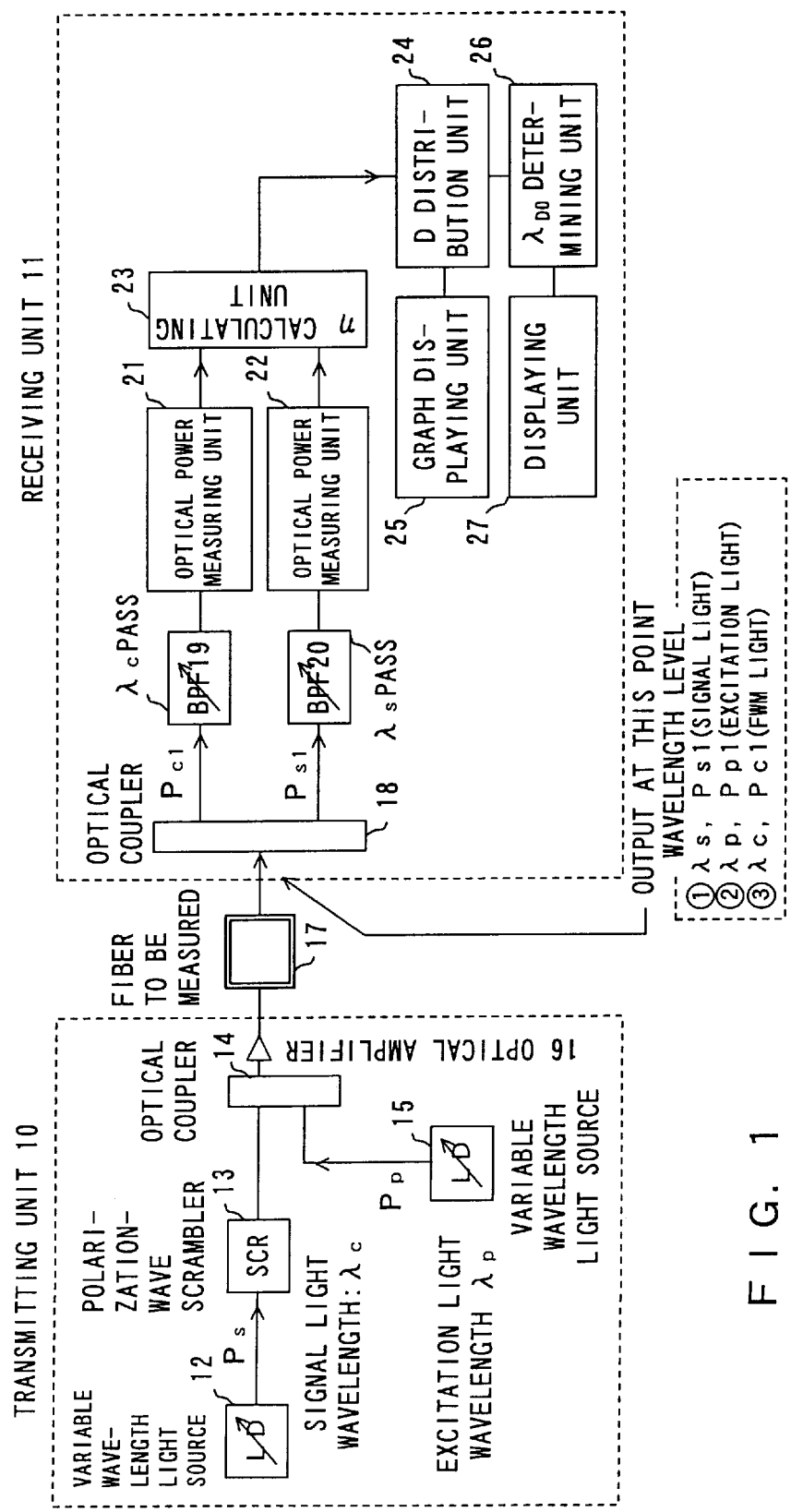
F I G. 1

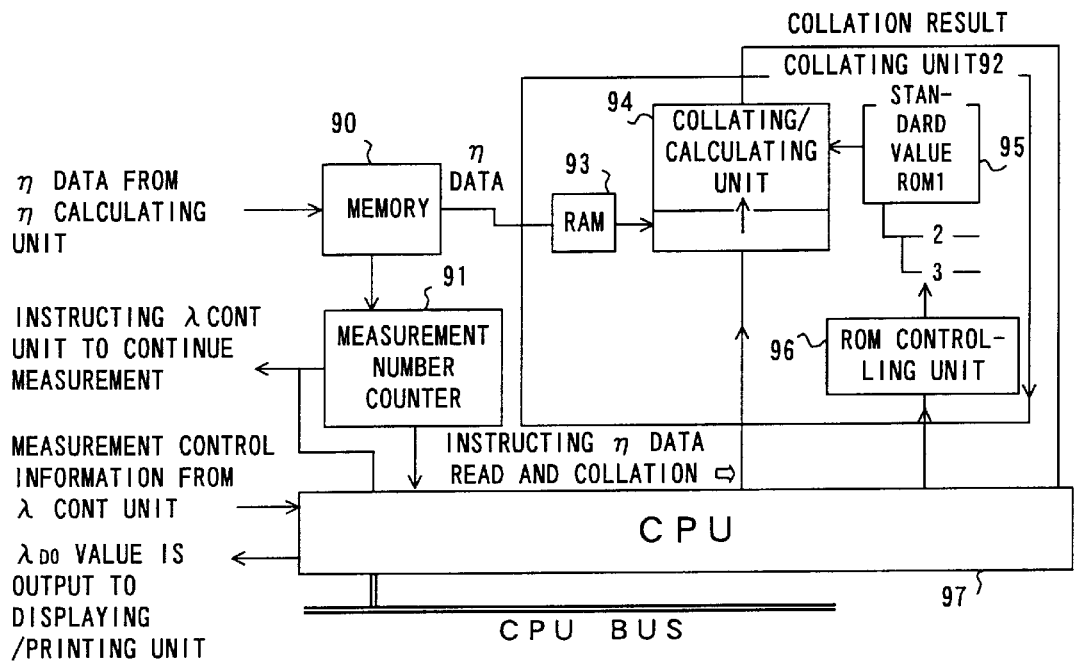

FIG. 7A

COLLATING UNIT COLLATES RESULT OF CALCULATING UNIT WITH DATA OF ROM

|   | CALCULATION RESULT | ROM | NOTE |
|---|---|---|---|
| ① PRESENCE/ABSENCE OF PEAK VALUE AMONG $\eta 1$ THROUGH $\eta 1D$ | $\eta\,max - \eta\,min$ | ROM1 $>10\,dB$ | MEASUREMENT OF 0-DISPERSION WAVELENGTH |
| ② PEAK VALUE AMONG $\eta 1$ THROUGH $\eta 1D$ | $\eta\,max$ | ROM2 $>-20\,dB$ | '' |
| ③ FLATNESS OF $\eta$ OF $\eta 1$ THROUGH $\eta 1D$ | $\eta\,max - \eta\,min$ | ROM3 $>5\,dB$ | '' |
| ④ RELATIONSHIP BETWEEN GENERATION AND DISPERSION VALUE | $\eta$ | ROM4 DATA SHOWN IN FIG.3 | MEASUREMENT OF DISPERSION VALUE OF PARTICULAR WAVELENGTH |

FIG. 7B

WAVELENGTH DISPERSION MEASUREMENT APPARATUS AND A METHOD THEREOF

BACKGROUND OF THE INVENTION

1. Field of the Invention

The present invention relates to an apparatus and a method for measuring a dispersion value of an optical fiber transmission line.

2. Description of the Related Art

With the arrangements of high-speed communications networks, optical communications systems using optical fibers have been built in recent years. In a dense wavelength multiplexing system or a super high-speed optical transmission system exceeding 2.4 Gbps, the wavelength dispersion characteristic of an optical fiber transmission line is an important system parameter. That is, if the wavelength dispersion characteristic of an optical fiber transmission line is inferior, the waveform of an optical transmission signal is deteriorated, which leads to improper reception of the signal on a receiving side. Accordingly, when an optical communications system using optical fibers is configured, it is essential to have good knowledge of the dispersion characteristics of the optical fibers to be used.

Especially, the knowledge of a 0-dispersion wavelength of an optical fiber may sometimes be vital to a system design. The dispersion value and the 0-dispersion wavelength of an optical fiber are standardized by the ITU-T, etc. Although optical fiber makers manufacture optical fibers based on this standard, non-uniformity of manufactured optical fibers cannot be prevented. It is therefore important to measure the dispersion value or the 0-dispersion wavelength of an actual optical fiber.

Conventional techniques disclose that the wavelength dispersion of an optical fiber is obtained by propagating optical pulses through an optical fiber, and measuring the difference between the travel speeds of the optical pulses, which is caused by wavelengths that are different due to wavelength dispersion, that is, the difference between group delay times at a receiving end. The conventional techniques adopt the following two methods.

Phase Shift Method

Preparing for light sources of different wavelengths, and precisely measuring the relative phases of modulated optical waveforms having the different wavelengths after transmission along a fiber.

Interference Method

Measuring an amount of delay time by using spectral white light (low-coherence light) and inserting a fiber to be measured into a port on one side of a Michelson interferometer.

Additionally, a method for making a measurement by using an OTDR (Optical Time-Domain Reflectometer) from both ends of a fiber, is disclosed.

Bidirectional OTDR Method

Measuring a backward scattering light occurring within an optical fiber by using an OTDR, and calculating a measured waveform. The bidirectional OTDR method is referred to in the "Wavelength Dispersion Distribution Measurement Technique for an Optical Transmission Line" by the R&D department of NTT.

With the above described methods, the average of measured wavelength dispersion values over the whole length of a measured fiber, or the distribution in a longitudinal direction is evaluated.

The conventional techniques require the measurement of the difference between wave speeds or the analysis of waveforms, which leads to an increase in a measurement system size (also in a measurement apparatus size).

Therefore, the measurement apparatus is difficult to move, so that the dispersion value of an installed optical fiber is difficult to be measured. That is, even if an optical fiber, after some operation or another, has a dispersion characteristic which is different from the dispersion value measured before installation, it is difficult to again measure the dispersion characteristic. Accordingly, there is a difficulty in suitably adjusting a communications system according to the dispersion characteristic of an installed optical fiber.

SUMMARY OF THE INVENTION

An object of the present invention is to provide a method which can easily measure a wavelength dispersion of an optical fiber, and can easily determine a 0-dispersion wavelength, and an apparatus thereof.

A wavelength dispersion measurement apparatus according to the present invention comprises a first light source for inputting to a fiber to be measured a first light having the same wavelength as that for which a dispersion value is to be measured; and a second light source for inputting to the fiber to be measured a second light, wherein the generation efficiency of a 4-wave mixed light that the first and second lights generate with the effects of 4-wave mixing within the fiber to be measured, is measured, and the wavelength dispersion value of the fiber to be measured is determined.

The present invention considers that the generation efficiency of 4-wave mixing occurring within a fiber depends on the wavelength dispersion value of the fiber, and obtains the wavelength dispersion value of the fiber by measuring the generation efficiency of the 4-wave mixing.

According to the present invention, a used light may be a direct current light. Therefore, there is no need to analyze the phase or the waveform of an optical pulse unlike in a conventional measurement apparatus, thereby reducing the complexity and the size of a measurement apparatus.

As a result, the dispersion value of an optical fiber can be measured not only in a laboratory, but also at a site where an optical fiber is actually installed, whereby each parameter (such as a dispersion compensation amount of a dispersion compensator) of a communications system can be adjusted while viewing the characteristics of an optical fiber, when the communications system using optical fibers is configured.

BRIEF DESCRIPTION OF THE DRAWINGS

FIG. 1 is a block diagram showing the principle of the present invention;

FIGS. 7A and 7B exemplify the configuration of a D distribution unit, and a table representing a collation process;

DESCRIPTION OF THE PREFERRED EMBODIMENTS

Figure 2:
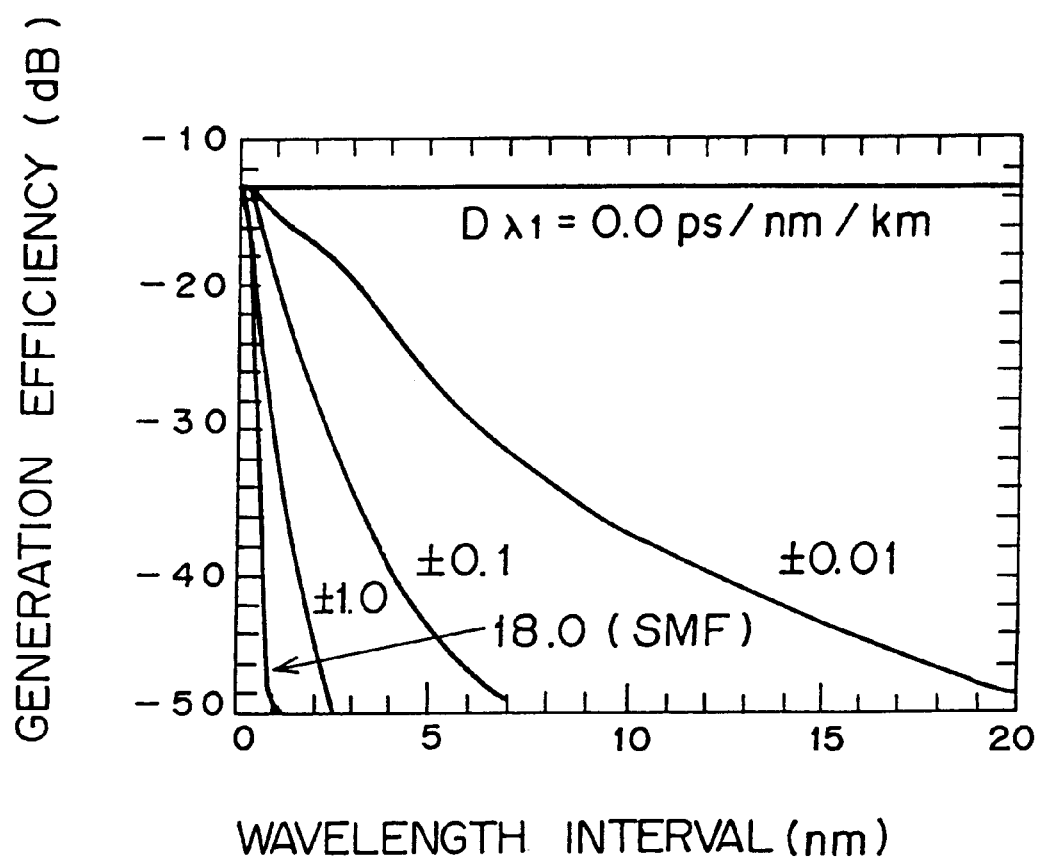
FIG. 2 shows the relationship between the channel interval between a signal and an excitation light, and the generation efficiency of an FWM light.

The present invention utilizes 4-wave mixing (FWM) occurring within a fiber. A 0-dispersion wavelength is obtained by using the dependency of the generation efficiency of the 4-wave mixing on the wavelength dispersion value of a fiber, and by measuring the FWM generation efficiency of the fiber to be measured at several wavelengths.

At this time, a light for measurement may be an unmodulated direct current light, and there is no need to convert the light into optical pulses, which leads to the simplification of a measurement system.

FIG. 1 is a block diagram showing the principle of the present invention.

The present invention utilizes 4-wave mixing (FWM), which is one of the non-linear effects of an optical fiber. The FWM is generated within a fiber to be measured by inputting a signal light ($\lambda s$) and an excitation light ($\lambda p$) to the fiber to be measured via an optical coupler. The power of the signal light may be set to an arbitrary level, while that of the excitation light is set to a level so that the FWM within an optical fiber is generated. The light generated by the FWM is referred to as an FWM light.

A dispersion value measurement apparatus according to the present invention includes a transmitting unit 10 and a receiving unit 11, between which a fiber to be measured 17 is connected. The transmitting unit 10 is composed of a variable wavelength light source 12 emitting a signal light having a wavelength $\lambda s$, and a variable wavelength light source 15 emitting an excitation light having a wavelength $\lambda p$. A polarization-wave scrambler 13 is arranged at the stage succeeding the variable wavelength light source 12 emitting a signal light. Since the generation efficiency of an FWM light depends on the states of the polarization waves of the signal and the excitation lights, the signal light is polarization-wave scrambled in order to eliminate any instability of the generation efficiency due to the polarization wave states.

The polarization-wave scrambled signal light and the excitation light from the variable wavelength light source 15 are coupled by an optical coupler 14, amplified by an optical amplifier 16, and input to the fiber to be measured 17.

Exemplified here is the configuration where a signal light is polarization-wave scrambled. However, an excitation light may be polarization-wave scrambled. Or, a polarization-wave control device may be arranged in order to maintain the relative relationship between the polarization waves of the signal and excitation lights. If a polarization-wave control device is arranged, the generation efficiency of an FWM light can be made higher than that in the case where a polarization-wave scrambling is performed.

The receiving unit 11 branches the light propagating through the fiber to be measured 17 into an FWM light ($\lambda d1$) and a signal light ($\lambda s1$) with an optical coupler 18. Additionally, only the FWM light having a wavelength $\lambda c$ is extracted by using a bandpass filter 19, while only the signal light having a wavelength $\lambda s$ is extracted by using a bandpass filter 20. The power levels of the respective lights are measured by optical power measuring units 21 and 22, and the difference between the power levels is obtained by a $\eta$ calculating unit 23. As a result, the generation efficiency of the FWM light is obtained. $\eta$ hereinafter indicates the generation efficiency of an FWM light. The generation efficiency of the FWM light obtained by the $\eta$ q calculating unit 23 is replaced with a corresponding dispersion value at a D distribution processing unit 24. The dispersion values of a measured optical fiber are displayed, for example, on a graph displaying unit 25 as a graph. If a 0-dispersion value is measured, the result of the process performed by the D distribution processing unit 24 is transmitted to a $\eta_{DO}$ determining unit 26, at which a 0-dispersion wavelength is obtained as a result of the process to be described later. Then, the obtained 0-dispersion wavelength is displayed on a displaying unit 27.

Note that dispersion values may not be displayed as a graph. Respective dispersion values may be displayed as numerical values for respectively measured wavelengths.

Since the generation efficiency of an FWM light ($\lambda c$) depends on a dispersion value of a fiber to be measured, a dispersion value (D) can be determined by measuring the generation efficiency.

FIG. 2 shows the relationship between the channel interval between a signal and an excitation light, and the generation efficiency of an FWM light.

As shown in this figure, the dependency of the generation efficiency of the FWM light on the wavelength interval between the signal and the excitation lights varies as the dispersion value of an optical fiber changes. As illustrated in this figure, the generation efficiency of the FWM light does not vary with the change of the wavelength interval between the signal and the excitation lights, if the dispersion value at the wavelength of the excitation light is 0.0 ps/nm/km (that is, if the value indicates a 0-dispersion wavelength). In the meantime, the generation efficiency decreases as the wavelength interval between the signal and the excitation lights becomes wider, if the dispersion value at the wavelength of the excitation light is ±0.01 ps/nm/km. Furthermore, this figure indicates that the generation efficiency varies much more as the dispersion value at the wavelength of the excitation light becomes larger.

Accordingly, when a 0-dispersion wavelength is searched, the wavelength of the excitation light, which causes almost no change to the generation efficiency of the FWM light, is searched while changing the wavelength interval between the signal and the excitation lights. If the dispersion value of a wavelength other than the 0-dispersion wavelength is desired to be measured, the generation efficiency of the FWM light is measured by keeping the wavelength interval between the excitation and the signal lights constant, and by setting the excitation light for the wavelength to be measured. Especially, if the dispersion value is large, the generation efficiency of the FWM light significantly drops even by slightly widening the wavelength interval between the signal and the excitation lights, as shown in FIG. 2. Therefore, the wavelength interval between the signal and the excitation lights must be set to a small value to some extent if the dispersion value is measured for a wavelength other than the 0-dispersion wavelength. For example, in this figure, if the dispersion value is measured up to 18.0 ps/nm/km, the wavelength interval between the signal and the excitation lights must be set to a value equal to or smaller than 1 nm.

Figure 3:
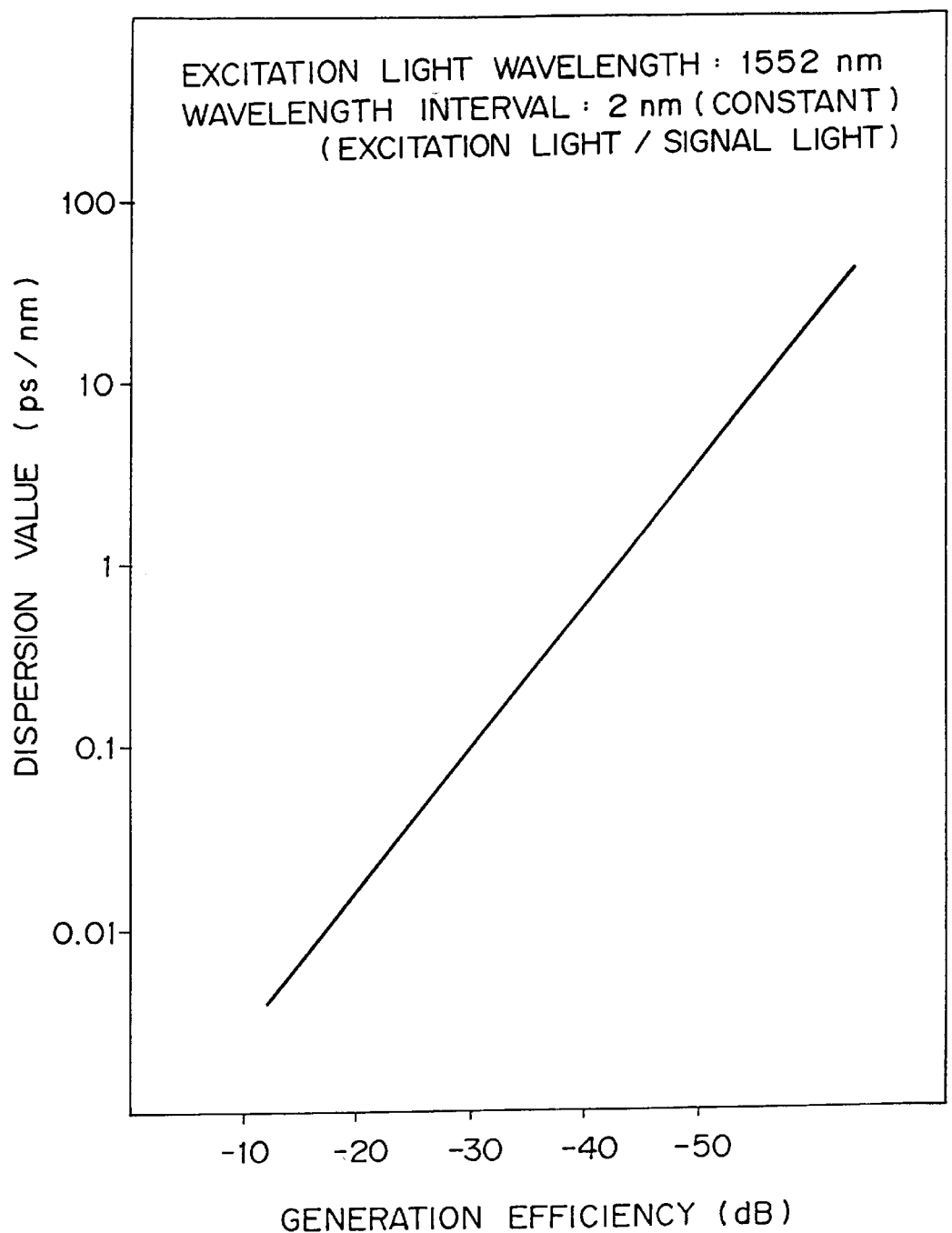
FIG. 3 shows the relationship between the generation efficiency of an FWM light and a dispersion value.

FIG. 3 shows the relationship between the generation efficiency of an FWM light and a dispersion value.

In this figure, the horizontal axis represents the generation efficiency of the FWM light (in decibels), while the vertical axis represents the logarithm of the dispersion value. Additionally, this figure shows the relationship between the generation efficiency and the dispersion value in the case where the wavelength of an excitation light is 1552 nm and a wavelength interval is 2 nm.

Here, the wavelength of the excitation light is the wavelength for which the dispersion value is desired to be measured. In this figure, the relationship between the generation efficiency and the dispersion value is almost linear. Furthermore, the relationship between the generation efficiency and the dispersion value exhibits almost no change if the wavelength to be measured, that is, the wavelength of the excitation light is changed. That is, if the graph shown in FIG. 3 is arranged for a single wavelength to be measured, dispersion values can be obtained for all the wavelengths in a bandwidth used for an optical transmission.

Note that the graph shown in this figure is stored as data in a device implementing the present invention. Because this data is dispersion value data, the value between one piece of data and another is obtained with an extrapolation process, etc.

Figure 4:
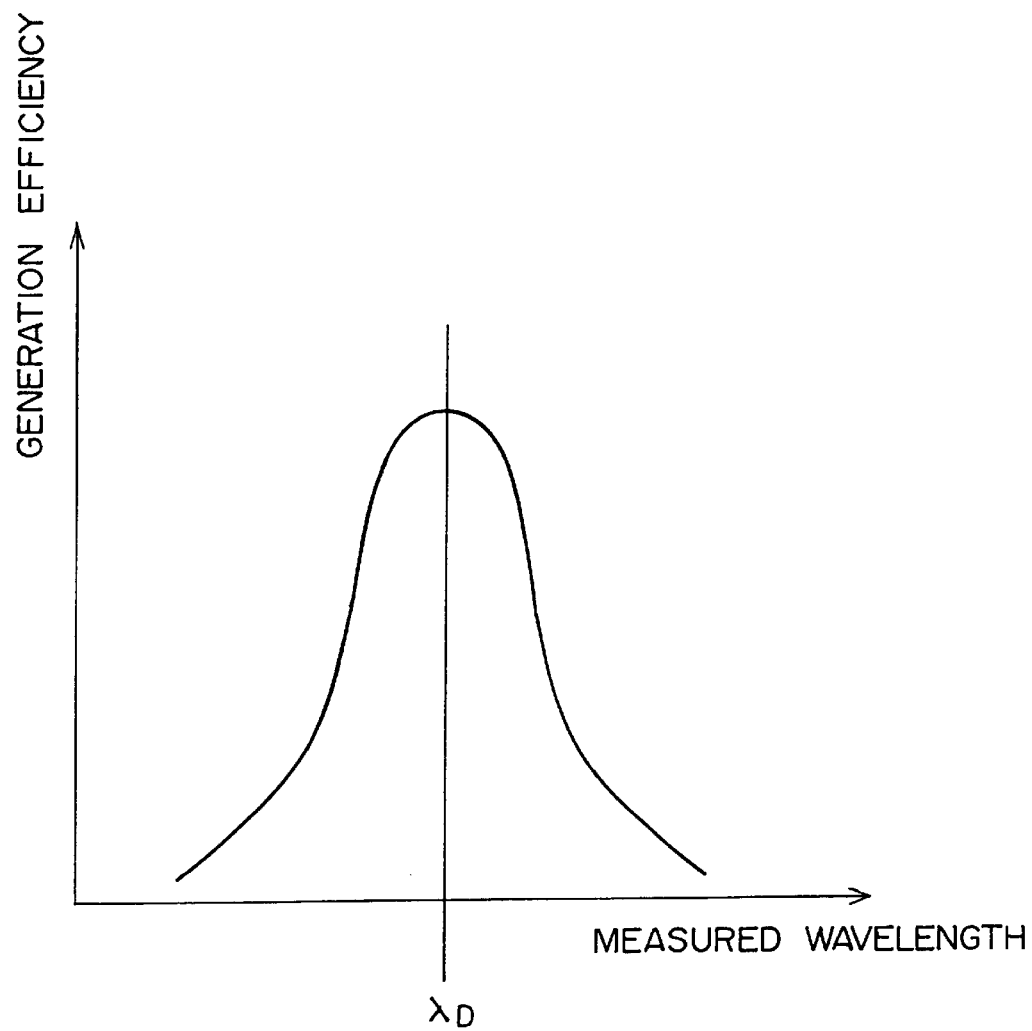
FIG. 4 shows the change in the generation efficiency with respect to a measured wavelength.

FIG. 4 is a graph representing the change in the generation efficiency with respect to a measured wavelength.

As shown in this figure, the generation efficiency exhibits a change shaped like a peak if the wavelength to be measured (the wavelength of the excitation light) is changed while keeping the wavelength interval between the excitation and the signal lights constant. The wavelength with the highest generation efficiency is the 0-dispersion wavelength of the optical fiber to be measured. Accordingly, to obtain the 0-dispersion wavelength, the wavelength with the highest generation efficiency is searched by changing the wavelength of the excitation light while keeping the wavelength interval between the excitation and the signal lights constant. Then, it is determined whether or not the generation efficiency exhibits a change by altering the wavelength interval between the signal and the excitation lights as shown in FIG. 2. As a result, the 0-dispersion wavelength is finally determined.

The dispersion value is determined with the following steps.

(1) The wavelength of an excitation light is set according to the wavelength for which the dispersion value is desired to be measured and the type (such as SFM and DSF) of the fiber to be measured. Since the nominal dispersion characteristics of respective types of an optical fiber are standardized by the ITU-T, they are referenced in order to initially set the wavelength when the dispersion value or the 0-dispersion wavelength is measured.

First of all, the initial value is determined in the vicinity of the nominal 0-dispersion wavelength of any of the respective types of an optical fiber.

For an SMF (Single Mode Fiber), its initial value is set in the vicinity of 1310 nm. For a DSF (Dispersion Shifted Fiber) and an NZ-DSF (Non-Zero Dispersion Shifted Fiber), their initial values are set in the vicinity of 1552 nm. An excitation light may be a direct current light in this case.

(2) The wavelength ($\lambda$s) of a signal light is set to a wavelength apart from an excitation light ($\lambda$p) by several nm. If the data shown in FIG. 3 is used, it is set apart by 2 nm. Also the signal light may be a direct current light.

(3) An FWM light ($\lambda$c) is generated within a fiber with a non-linear effect by simultaneously inputting the excitation and the signal lights to the fiber to be measured. If the dispersion value of a particular wavelength is obtained, the wavelength of the excitation light is made equal to the wavelength whose dispersion value is desired to be obtained, and the generation efficiency ratio $\eta$ of the FWM light is measured.

The dispersion value of the fiber to be measured on the excitation light wavelength can be determined with the following equation.

$$\eta = -(P_s1 - P_c1) \quad (1)$$

where $P_s1$ is the power level of the signal light, and $P_c1$ is the power level of the FWM light. Notice that measurement with higher accuracy can be implemented by measuring beforehand the loss of the bandpass filter used for extracting the signal and the FWM lights and by adding the term for correcting this loss to the above equation (1), when $\eta$ is calculated.

The relationship between the generation efficiency of the FWM light and the dispersion value when the wavelength interval is made constant is obtained from FIG. 3.

(4) The relationship between the excitation light, the signal light, and the FWM light becomes that represented by the following equation. With this equation, the wavelength of the FWM light can be easily obtained, so that the automatic measurement of the dispersion value can be facilitated by automatically adjusting the passing band of the variable bandpass filter.

$$\lambda c = 2\lambda p - \lambda s \quad (2)$$

(5) To obtain the 0-dispersion wavelength, $\lambda$p and $\lambda$s are set apart by several nm (such as 2 nm), and the generation efficiency is measured by changing the wavelength interval between the excitation light with the wavelength $\lambda$p and the signal light with the wavelength $\lambda$s while keeping the interval constant. Then, the wavelength of the excitation light, which maximizes the generation efficiency, is obtained. Thereafter, the wavelength of the excitation light is set so that the generation efficiency becomes a maximum. The wavelength of the signal light is gradually separated from the wavelength of the excitation light in several nm units. If the change of the generation efficiency is slight at this time, the wavelength of the excitation light is displayed as the 0-dispersion wavelength of the fiber to be measured. If the change of the generation efficiency is significant, the wavelength of the excitation light is set to a value in the range of a wavelength yet to be measured. The measurement process starting from step (1) is then repeated.

(6) The dispersion value determined with the above described measurement process is an average value of the measurement wavelength (the wavelength of the excitation light) of the fiber to be measured in the longitudinal direction.

Figure 5:
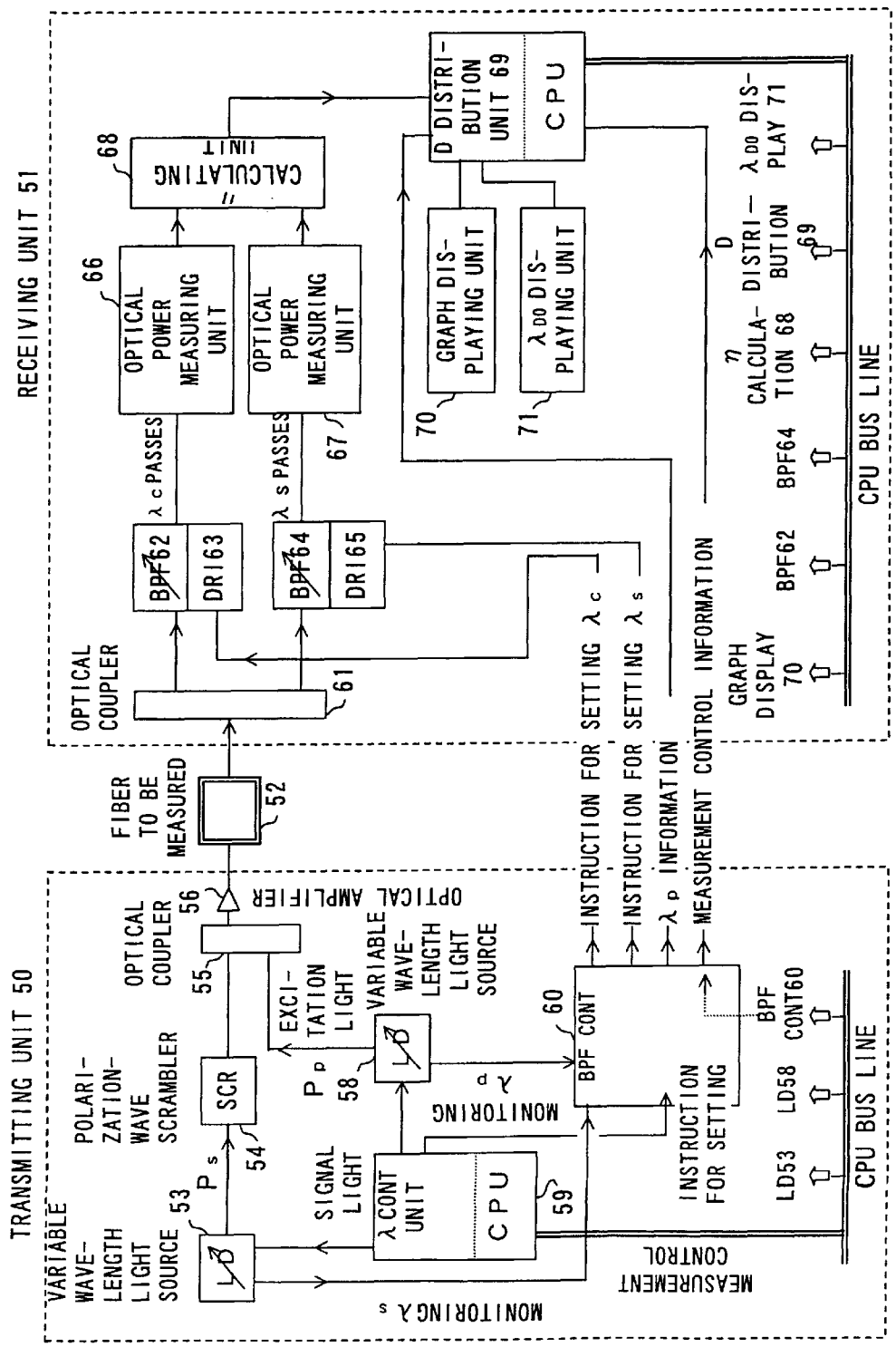
FIG. 5 is a block diagram showing the configuration of a first preferred embodiment according to the present invention.

FIG. 5 is a block diagram showing the configuration of a first preferred embodiment according to the present invention.

This figure exemplifies the case where an input and an output of a fiber to be measured can be connected to a measurement system at the same point.

A wavelength dispersion measurement apparatus according to this preferred embodiment includes a transmitting unit 50 and a receiving unit 51, between which an optical fiber to be measured 52 is connected. The transmitting unit 50 includes a variable wavelength light source 53 and a variable wavelength light source 58. The variable wavelength light source 53 generates a signal light, while the variable wavelength light source 58 generates an excitation light. At least either of the signal and excitation lights are assigned a high power level such that 4-wave mixing is caused within an optical fiber. Additionally, the signal light is polarization-wave scrambled by a polarization-wave scrambler 54, so that the generation efficiency of the FWM light, which is caused by the 4-wave mixing, does not fluctuate according to the polarization-wave state of the excitation light. As described above, the polarization-wave scrambling may be performed for the excitation light. The generation efficiency of the FWM light may be stabilized also by actively controlling the polarization-wave states of the signal and the excitation lights.

The signal light and the excitation light, which are polarization-wave scrambled, are coupled by an optical coupler 55, amplified by an optical amplifier 56, and input to the fiber to be measured 52. The light output from the fiber to be measured 52 is split by an optical coupler 61 in the receiving unit 51, and the split lights are input to bandpass filters 62 and 64, of which the passing band can be changed. The bandpass filters 62 and 64 are controlled by respective drivers 63 and 65 in order to make the FWM and signal lights pass through. Which wavelengths the FWM and the signal lights possess are notified from a bandpass filter controller (BPF CONT) 60 of the transmitting unit 50. The BPF CONT 60 obtains as information the wavelengths of the lights output from the respective variable wavelength light sources 53 and 58, calculates the wavelength of the FWM light with the above described equation (2), and provides the drivers 63 and 65 of the receiving unit 51 with necessary information.

The power levels of the FWM and the signal lights, which have passed through the bandpass filters 62 and 64, are detected by optical power measuring units 66 and 67. A η calculating unit 68 calculates the generation efficiency of the FWM light from the power levels of the signal and FWM lights, which are obtained by the optical power measuring units 66 and 67, with the above described equation (1), and transmits the data to a D distribution unit 69. The D distribution unit 69 calculates the dispersion value from the received generation efficiency of the FWM light, and respectively instructs the bandpass filters 62 and 64, the η calculating unit 68, a graph representing unit 70, a $\eta_{DO}$ displaying unit 71, etc. of wavelength control, a calculation process, the display timing of data, etc. via a CPU bus line.

In the transmitting unit 50, a λ CONT unit 59 instructs the determination of a wavelength to be measured and measurement procedures, and controls the variable wavelength light sources 53 and 58. The λ CONT unit 59 is intended to control the wavelengths output from the variable wavelength light sources 53 and 58 within the transmitting unit 50, and to provide the wavelength information of the bandpass filters 62 and 64 within the receiving unit 51. An internal CPU is intended to control the measurement procedures of the λ CONT unit 59 by providing respective units with a timing signal for switching via a CPU bus line.

The BPF CONT 60 transmits λc setting information for calculating λc from the equation (2) to a wavelength setting unit DRV 63 of the bandpass filter BPF 62, and sets the passing band of the bandpass filter BPF 62 to λc, based on the monitor information of λs and λc. Additionally, the BPF CONT 60 transmits the λc setting information to the wavelength setting unit DRV 65 of the bandpass filter BPF 64, and sets the passing band of the bandpass filter BPF 64 to λs.

The bandpass filters BPFs 62 and 64 are variable wavelength bandpass filters. Their passing bands are changed by controlling the respective driving unit DRV with a control signal from the BPF CONT 60. Lithium niobate tunable filters (AOTF) of a TE-TM mode conversion type using acoustic effects, etc. are used as the bandpass filters BPFs 62 and 64. Or, a mechanical variable configuration may be used.

The optical levels of λc and λs which have passed through the bandpass filters BPFs 62 and 64 are measured by an optical power measuring unit 66 and 67, respectively. At this time, the passage losses of the bandpass filters BPFs 62 and 64 which are obtained as correction values beforehand, are used in the calculation. η is calculated with the equation (1) in the η calculating unit 68.

The λ CONT unit 59 changes the wavelength to be measured, and repeats the above described measurement process. The D distribution unit 69 determines the distribution of dispersion values from η of the wavelength to be measured (the wavelength λp of the excitation light). The distribution may be represented as a graph on a graph displaying unit 70. A $\lambda_{DO}$ displaying unit 71 determines the wavelength which is a peak value to be a 0-dispersion wavelength upon receipt of the D distribution data (the data representing the distribution of dispersion values). The $\lambda_{DO}$ displaying unit 71 then displays this wavelength.

It is desirable that the measurement ranges of optical power levels of the power measuring units 66 and 67 are made variable. This is because the generation efficiency of an FWM light significantly varies depending on whether the wavelength of an excitation light is either a 0-dispersion wavelength or in the range of a wavelength with a large dispersion value. The horizontal and the vertical axes are on a logarithmic scale as shown in FIG. 3. Therefore, if the graph is drawn on a linear scale, the generation efficiency significantly fluctuates with the change of a dispersion value. With the logarithmic display, the relationship between the generation efficiency and the dispersion value can be linearly approximated. The logarithmic display, however, is introduced by human beings for the sake of convenience in order to describe data. Therefore, the optical power measuring units 66 and 67 measure power levels on a linear scale, so that the power level to be detected differs by a considerable number of digits with a dispersion value difference. Therefore, it is desirable that the power measurement ranges of the optical power measuring units 66 and 67 are configured to be variable.

Figure 6:
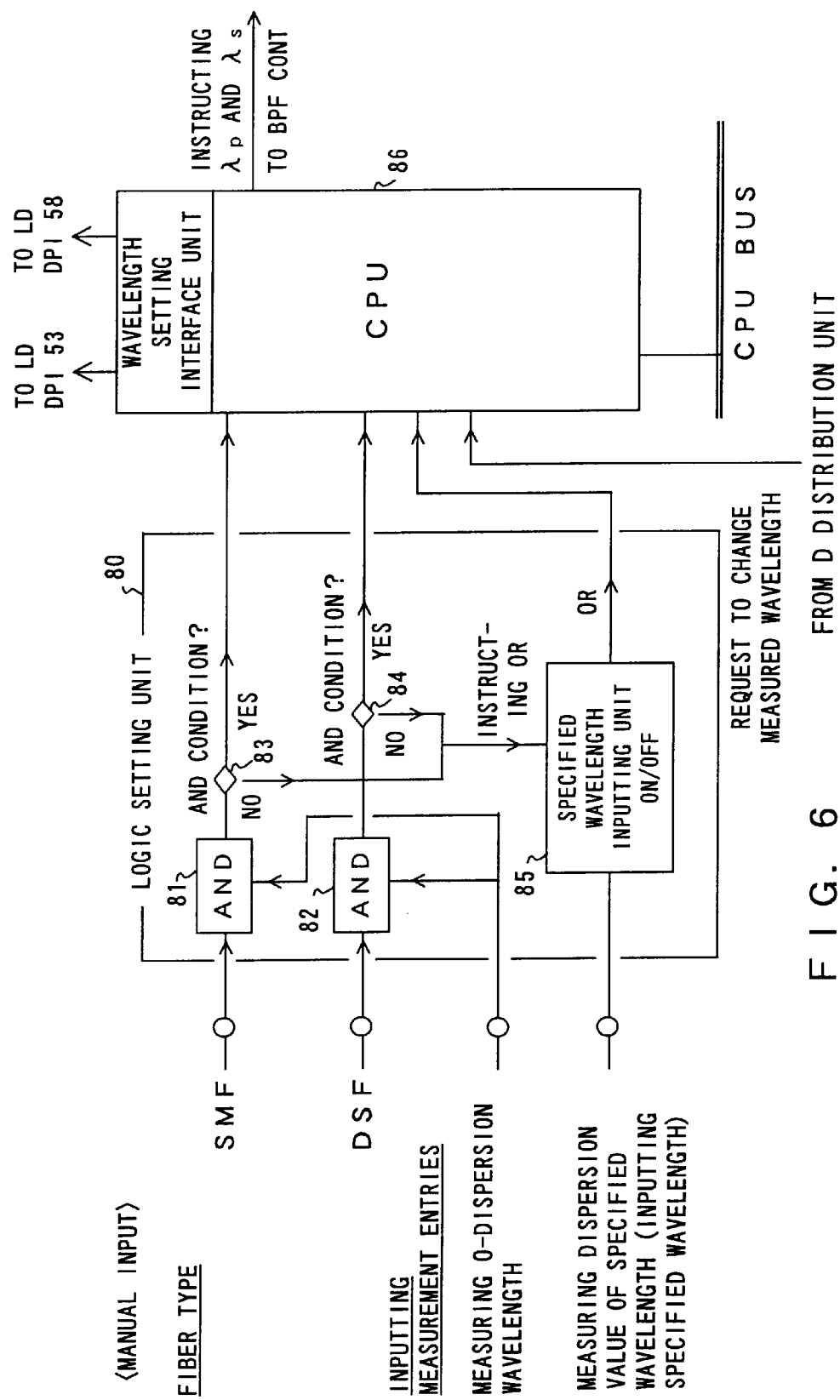
FIG. 6 exemplifies the configuration of a λ CONT unit.

FIG. 6 is a block diagram exemplifying the configuration of the λ CONT unit.

The λ CONT unit is mainly composed of a logic setting unit 80 and a CPU 86. The logic setting unit 80 provides the CPU 86 with the information about whatever measurement is to be performed upon receipt of a manually input measurement condition. Input entries include the type of the fiber to be measured, and the information about whether measurement is either a 0-dispersion wavelength measurement or a dispersion value measurement of a specified wavelength. The types of the fiber to be measured include two types such as an SMF and a DSF. An operator manually inputs either of these two types. The operator further inputs either of the 0-dispersion wavelength measurement and the dispersion value measurement of a specified wavelength. For the 0-dispersion wavelength measurement, the signal instructing this type of measurement and the signal representing a fiber type are ANDed by AND circuits 81 and 82. Then, whether or not the logic of the signal resultant from the AND operation indicates "1" is determined by AND condition determining units 83 and 84. If the instruction for measuring the 0dispersion wavelength is input for either the SMF or the DSF, either of the outputs of the AND circuits 81 and 82 will become the logic "1". Consequently, the instruction for measuring the 0-dispersion wavelength for the SMF or the DSF is input to the CPU 86. If neither of the outputs of the AND circuits 81 and 82 becomes "1", it is determined that the dispersion value of a specified wavelength is instructed. Then, the instruction for turning on a specified wavelength inputting unit 85 is output from the AND condition determining units 83 and 84. The operator inputs a particular wavelength according to this instruction. When the specified wavelength is input, the instruction for measuring the dispersion value of this wavelength is input to the CPU 86. Additionally, the request to change the wavelength to be measured is input from the D distribution unit within the receiving unit to the CPU 86. This is a request to make measurements for obtaining the distribution of dispersion values in a certain wavelength range.

The wavelength $\lambda p$ of an excitation light and the wavelength $\lambda s$ of a signal light are transmitted from the CPU 86 to the BPF CONT, and are used for controlling the bandpass filters of the receiving unit. Furthermore, the signals for setting the wavelengths of the lights to be output from the variable wavelength light sources 53 and 58 are output to the drivers of the variable wavelength light sources 53 and 58 via a wavelength setting interface unit.

To the CPU bus connected to the CPU 86, a measurement sequence control signal for instructing the timing at which the wavelength set for each unit is switched is output when a dispersion value is measured.

FIGS. 7A and 7B exemplify the configuration of the D distribution unit.

As shown in FIG. 7A, the D distribution unit receives the generation efficiency $\eta$ from the $\eta$ calculating unit, and stores it in a memory 90. A signal is transmitted from the memory 90 to a measurement number counter 91 each time a measurement is performed, so that the number of measurement times is counted. The number of measurement times is input to a CPU 97. If the number of measurement times does not reach a predetermined number, the instruction for continuing the measurements is transmitted from the measurement number counter 91 and the CPU 97 to the $\lambda$ CONT unit. Furthermore, the generation efficiency $\eta$ stored in the memory 90 is transmitted to a collating unit 92. The collating unit 92 once stores the value of $\eta$ in a RAM 93. Then, a collating/calculating unit 94 collates the value resultant from a calculation with the value of a standard value ROM 95 ("n" ROMs are normally arranged: "n" is an integer), and notifies the CPU 97 of the result of the collation. The instruction for reading the value of $\eta$ and for performing collation is issued from the CPU 97 to the collating/calculating unit 94. Furthermore, the instruction for controlling which standard value is to be transmitted to the collating/calculating unit 94 is input to the standard value ROM 95, etc. A standard value is read from the standard value ROM 95 according to the instruction issued from a ROM controlling unit 96.

Furthermore, measurement control information is input from the $\lambda$ CONT unit to the CPU 97, which controls a measurement sequence and outputs to a graph displaying unit, etc. the instruction for displaying a dispersion value, or the instruction for displaying or printing a 0-dispersion wavelength $\lambda_{DO}$. The signal indicating the operation timing at which the measurement sequence is controlled for each unit is output to the CPU bus connected to the CPU 97.

FIG. 7B shows the collation process performed by the collating/calculating unit as a table.

For the 0-dispersion wavelength measurement, the generation efficiencies of a plurality of wavelengths of an excitation light are measured (FIG. 7B exemplifies the case where measurement is repeated ten times), and the differences between the maximum and minimum values of the obtained generation efficiencies are calculated. The results of these calculations are collated, for example, with a value 10 dB stored in a ROM 1, and it is determined whether or not a difference equal to or more than 10 dB is obtained. Then, the peak value is searched among the plurality of measured generation efficiencies. Then, it is determined whether or not the peak value is larger than, for example, −20 dB stored in a ROM 2. If the peak value is larger than −20 dB, it is determined to be a probable 0-dispersion. Then, the generation efficiencies are measured by changing the wavelength interval between the excitation and the signal lights (8 generation efficiencies $\eta 11$ through $\eta 18$ are obtained in FIG. 7B). Next, the differences between the maximum and the minimum values of the generation efficiencies, which are obtained by changing the wavelength interval, are calculated, and it is determined whether or not the calculated differences are smaller than, for example, 5 dB stored in a ROM 3. If they are smaller, the wavelength of the excitation light is output as the 0-dispersion wavelength. This is because the wavelength of the excitation light is determined to match the 0-dispersion wavelength.

If the wavelength of the excitation light is determined not to be the 0-dispersion value as a result of the above described collation, the measurement is further repeated by changing the wavelength of the excitation light.

For the measurement of the dispersion value of a particular wavelength, the wavelength of the excitation light is set to a desired wavelength, and the generation efficiency $\eta$ is obtained. For example, the graph representing the relationship between the generation efficiency and the dispersion value, which is shown in FIG. 3 and is put into data, is stored in a ROM 4, and the dispersion value is acquired from the obtained generation efficiency. Since the graph becomes a set of discrete values by being put into data, a dispersion value is obtained by performing an extrapolation process if the generation efficiency becomes the value between adjacent pieces of data.

Figure 8:
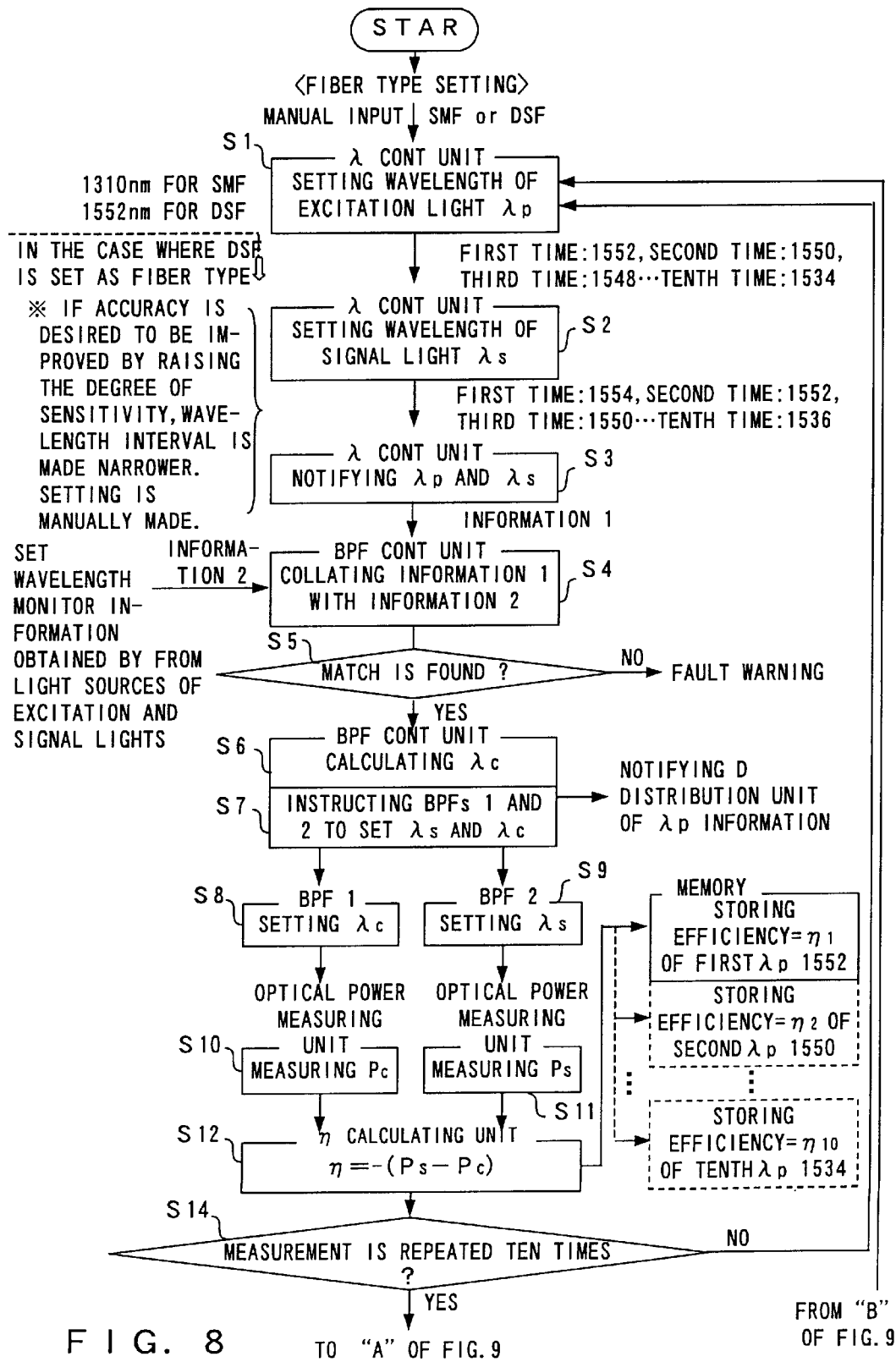
FIG. 8 is a flowchart showing the process for measuring a 0-dispersion wavelength (No. 1)
Figure 9:
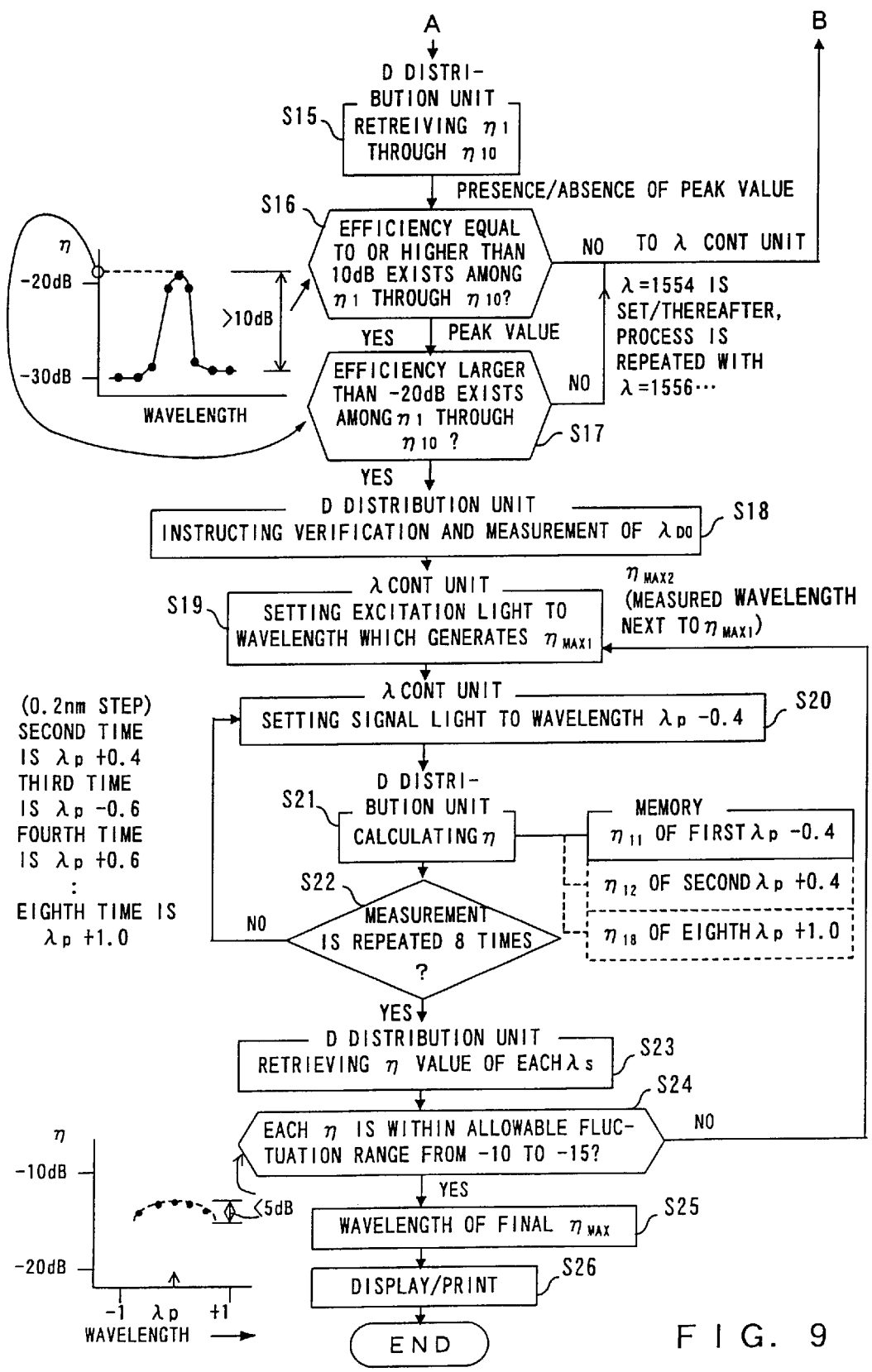
FIG. 9 is a flowchart showing the process for measuring a 0-dispersion wavelength (No. 2)

FIGS. 8 and 9 are flowcharts showing the process for measuring a 0-dispersion wavelength.

First of all, a fiber type (an SMF or a DSF in FIG. 8) is manually input. In step S1, the wavelength $\lambda p$ of an excitation light is set in the $\lambda$ CONT unit. $\lambda p$ is obtained from the value of the 0-dispersion depending on the fiber type selected from the nominal dispersion value, and measurement is performed in its vicinity. For example, if the SMF type is selected, $\lambda p$ is set to 1310 nm. If the DSF is selected, $\lambda$ is set to 1552 nm. FIG. 8 shows the case where the DSF type is selected as the fiber type.

In step S2, the wavelength $\lambda s$ of a signal light is set in the $\lambda$ CONT unit. The wavelength $\lambda s$ of the signal light is set to a value shifted from the wavelength $\lambda p$ of the excitation light by a predetermined wavelength interval. For example, the interval between $\lambda s$ and $\lambda p$ is assumed to be 2 nm in FIG. 8. If the sensitivity of measurement is desired to be improved, the wavelength interval is set to be narrower. In step S3, the λ CONT unit notifies the BPF CONT of λp and λs as information 1. Additionally, the oscillation wavelengths obtained by monitoring the respective light sources of the excitation and signal lights are obtained as information 2. In step S4, the comparison between the information 1 and 2 is made. If the apparatus properly operates at this time, the respective light sources should output the lights having the preset wavelengths λs and λp. Therefore, a match should be found in step S5. If a match is not found, the apparatus is determined to encounter a fault, and the process is stopped by issuing fault warning.

If a match is found, the BPF CONT calculates λc with the above described equation (2) in step S6, instructs the two bandpass filters of the receiving unit to set λs and λc, and notifies the D distribution unit of λp in step S7. The passing bandwidth of the bandpass filter BPF 1 which makes an FWM light pass through is set to λc in step S8, while the passing bandwidth of the bandpass filter BPF 2 which makes a signal light pass through is set to λs (step S9). The power levels $P_c$ and $P_s$ of the FWM and signal lights which have passed through the bandpass filters BPF 1 and BPF 2 are measured by the optical power measuring units (steps S10 and S11). The generation efficiency η of the FWM light is calculated from the measured power levels by the η calculating unit (step S12). Each generation efficiency obtained by each measurement is stored in a memory along with the wavelength of the excitation light at the time of the corresponding measurement. In step S14, it is determined whether or not a predetermined number of measurement times is reached. The case shown in FIG. 8 assumes that the measurement is repeated 10 times. The number of times may be suitably set by an operator. If the predetermined number of measurement times is not reached, the process goes back to step S1 where the measurement is further repeated. The result of each measurement is stored in a memory also in this case. How the wavelength λp is set at each measurement may be suitably set by an operator. If it is determined that the predetermined number of measurement times is reached in step S14 of FIG. 8, the process goes to step S15 of FIG. 9.

In step S15, the generation efficiencies of the FWM light, which are measured so far, are retrieved from the memory by the D distribution unit. In step S16, it is determined whether or not a generation efficiency which indicates a peak value is included. FIG. 9 assumes that the value which is larger than the other generation efficiencies by 10 dB or more is the peak value. If the peak value is determined not to be included, the process goes back to step S1 of FIG. 8 where the wavelength λp of the excitation light is reset and the measurement is repeated. If the peak value is determined to be included in step S16, it is further determined whether or not the peak value is equal to or larger than −20 dB in step S17. If "NO", the process goes back to step S1 of FIG. 8 where the wavelength λp of the excitation light is reset and the measurement is again performed.

If the peak value satisfying the condition is determined to exist in step S17, the D distribution unit instructs the λ CONT unit to verify and measure the 0-dispersion wavelength ADO in step S18. The A CONT unit sets the wavelength of the excitation light to the wavelength which makes the generation efficiency of the FWM light a maximum (the above obtained maximum generation efficiency ηmax1). In step S20, the λ CONT unit sets the wavelength of the signal light to the position shifted from the wavelength of the excitation light by a predetermined wavelength interval (0.4 nm in FIG. 9). In step S21, the D distribution unit measures the generation efficiency η, and stores the generation efficiency in the memory along with the wavelength of the signal light. In step S22, it is determined whether or not a predetermined number of measurement times is reached (8 times in FIG. 9). If "NO" in step S22, the process goes back to step S20 where the measurement is repeated. If "YES" in step S22, the D distribution unit reads the generation efficiency η of each λs (each wavelength of the signal light) in step S23. In step S24, the value of each η fluctuates within a predetermined range (the range from −10 to −15 dB in FIG. 9). If "NO" in step S24, the value of the excitation light is reset to a value which can possibly become a 0-dispersion wavelength candidate other than the wavelength of the excitation light, which corresponds to the generation efficiency determined to be the peak value in step S17, in step S17. The process is then repeated. If "YES" in step S24, the 0-dispersion value is determined to be obtained. The current wavelength of the excitation light is therefore determined to be the 0-dispersion wavelength in step S25, and this wavelength is displayed or printed in step S26.

Note that the wavelength of the signal light is changed in 0.2 nm steps in FIG. 9. However, the wavelength change is not limited to this implementation. This change may be suitably set by an operator.

Figure 10:
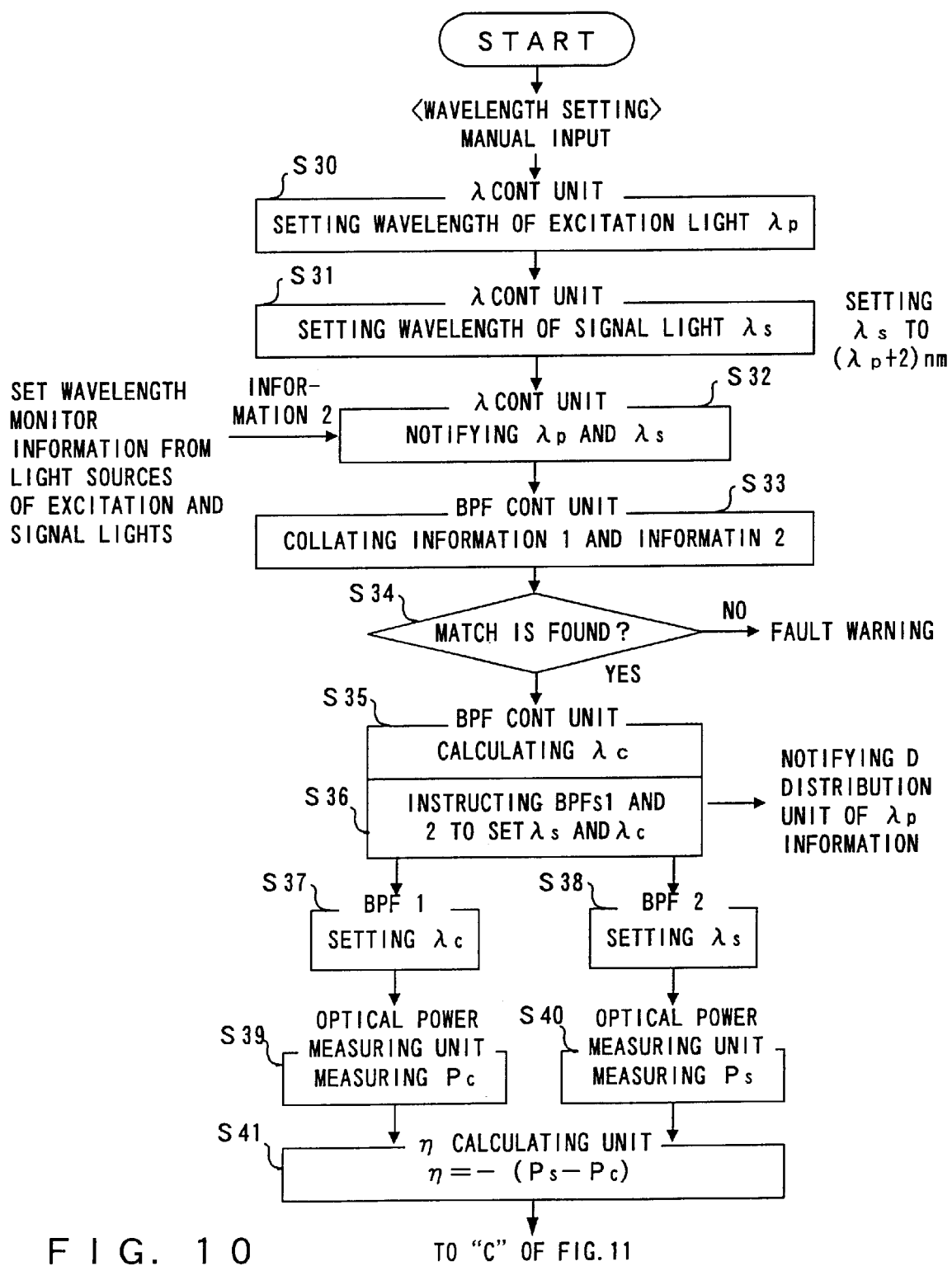
FIG. 10 is a flowchart showing the process for measuring a dispersion value of a particular wavelength (No. 1)
Figure 11:
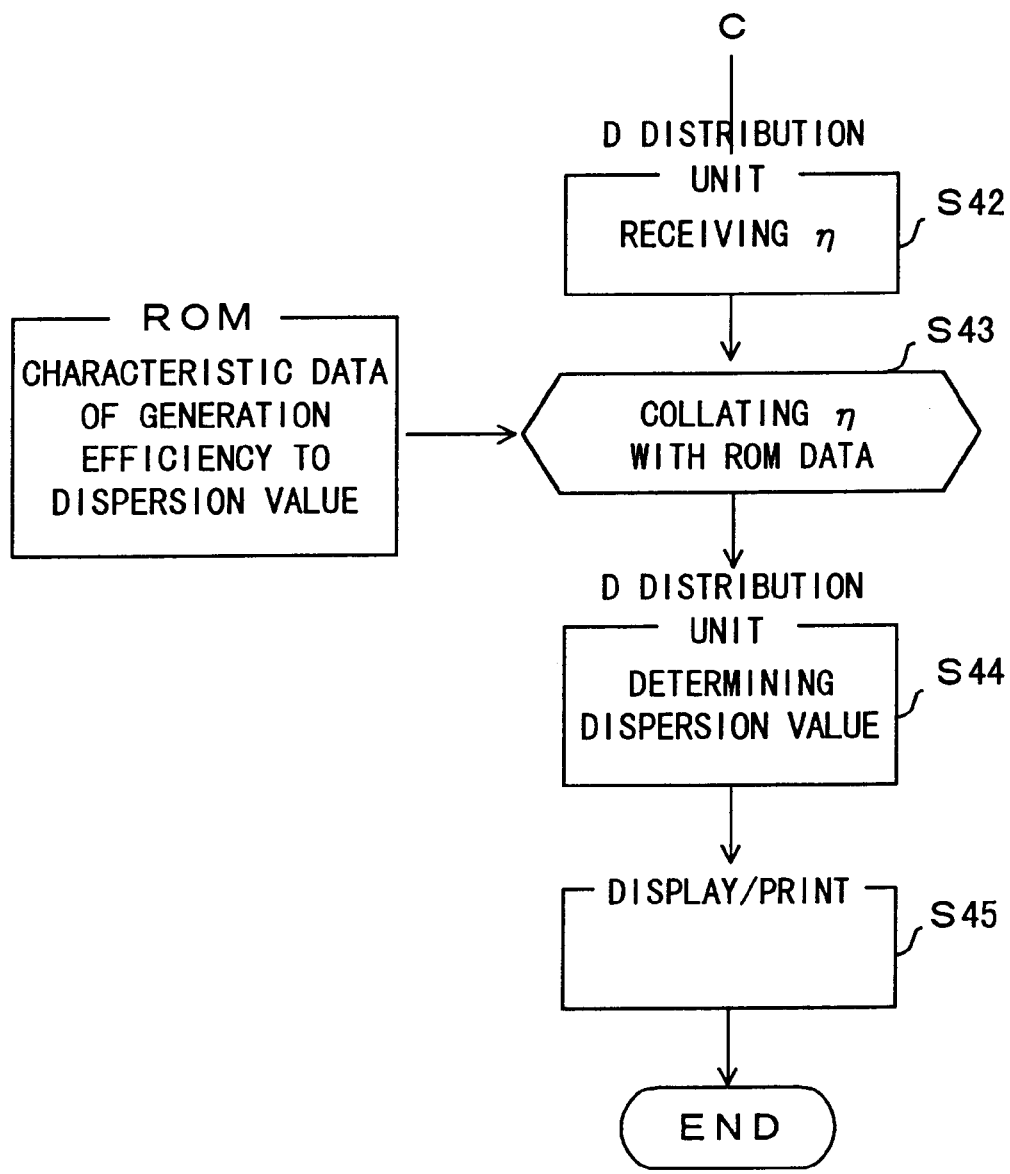
FIG. 11 is a flowchart showing the process for measuring a dispersion value of a particular wavelength.

FIGS. 10 and 11 are flowcharts showing the process for measuring a dispersion value of a particular wavelength.

First of all, a wavelength whose dispersion value is desired to be measured is manually set prior to the start of the process. In step S30, the λ CONT unit assigns the wavelength λp of the excitation light to the set wavelength. In step S31, the λ CONT unit sets the wavelength λs of the signal light to the value shifted from the wavelength λp of the excitation light by a predetermined wavelength interval. FIG. 10 assumes the wavelength interval to be 2 nm. The λ CONT unit notifies the BPF CONT of λp and λs as information 1 in step S32. Additionally, the BPF CONT obtains as information 2 the monitor information of the excitation and signal lights emitted from their light sources. In step S33, the BPF CONT collates the information 1 with the information 2. In step S34, it is determined whether or not the information 1 and 2 match. If "NO", a fault is determined to occur, and fault warning is issued. If "YES" in step S34, the apparatus is determined to properly run. The process therefore goes to step S35.

In step S35, the BPF CONT calculates λc with the above described equation (2), and instructs the bandpass filters BPFs 1 and 2 which make the signal and FWM lights pass through to respectively set λs and λc. As a result, the bandpass filters BPFs 1 and 2 pass the respective λs and λc through in steps S37 and S38. In steps S39 and S40, the optical power measuring units measure the power level $P_c$ of the FWM light and the power level $P_s$ of the signal light, and transmits the measured power levels to the η calculating unit. The η calculating unit calculates the generation efficiency η from the power levels of the FWM and signal lights in step S41, and transmits the calculated generation efficiency to the D distribution unit.

The D distribution unit receives the calculated generation efficiency η in step S42 in FIG. 11, collates the captured generation efficiency η with the characteristic data of generation efficiency to dispersion value in step S43, and determines the dispersion value in step S44. If the process for extrapolating data, etc. must be performed at this time, the extrapolation process, etc. is performed with a known means, so that the dispersion value is determined. When the dispersion value is determined, the resultant value is output by being displayed, printed, etc. (step S45). Note that the process shown in FIGS. 10 and 11 may be performed for a plurality of wavelengths of an excitation light, and the dispersion values of the fiber to be measured in a particular wavelength area may be displayed as a graph.

Figure 12:
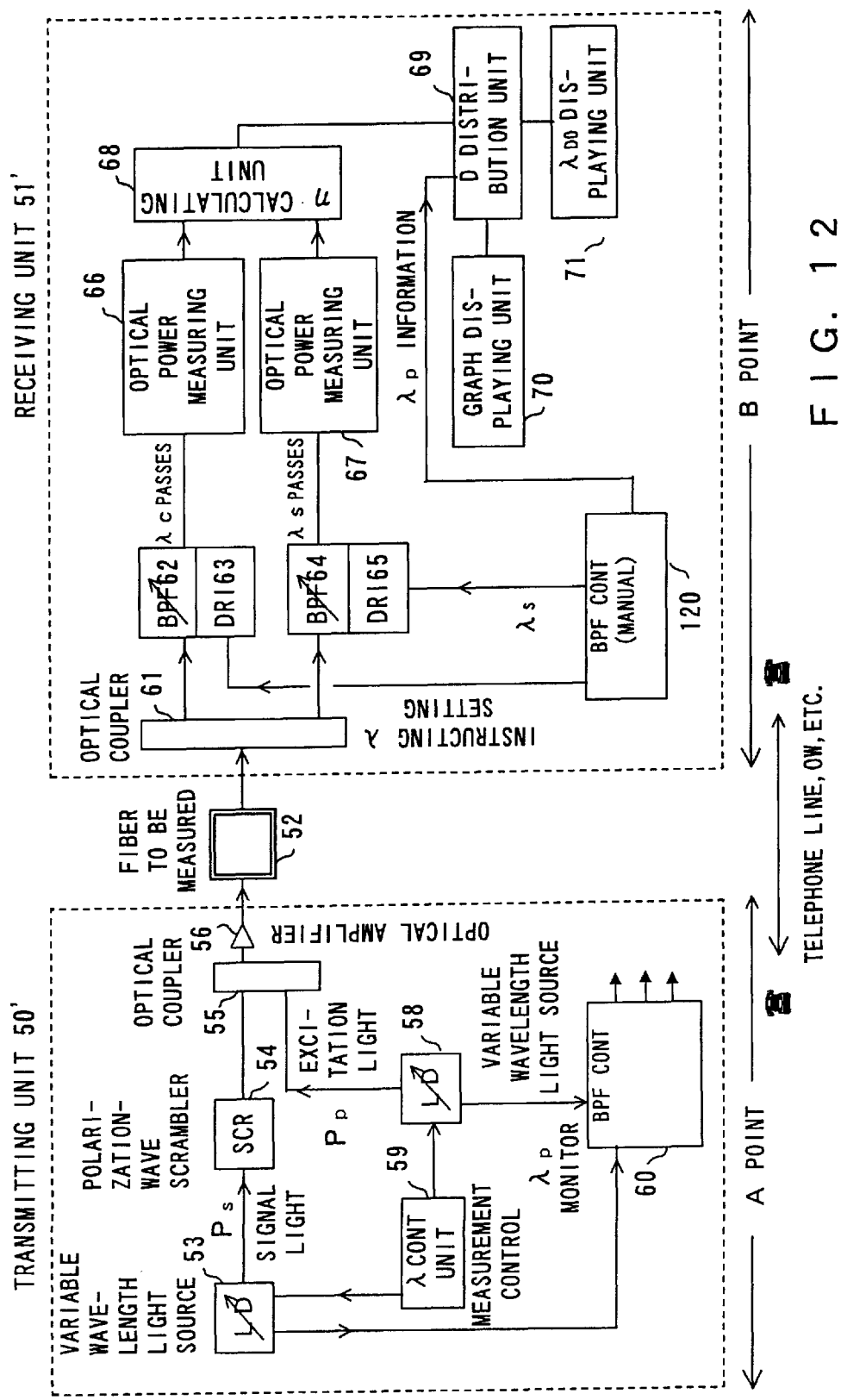
FIG. 12 is a block diagram showing the configuration of a second preferred embodiment according to the present invention.

FIG. 12 is block diagram showing a second preferred embodiment according to the present invention.

In this figure, the same constituent elements as those shown in FIG. 5 are denoted by the same reference numerals.

This figure exemplifies the case where an input and an output of a fiber to be measured 52 are arranged at different points. That is, this figure shows the method with which the fiber is manually measured by making persons who make measurements stay at both of the input and output points, and making them exchange the measurement procedures, BPF settings, etc. using a telephone line, an order wire (OW), etc. if the fiber to be measured 52 has only a single core.

The case shown in this figure is a case where a dispersion value of an actually installed optical fiber is to be measured.

The λ CONT 59 controls the variable wavelength light sources 53 and 58, which respectively emit a signal and an excitation light, and sets the wavelengths of the signal and excitation lights to suitable values when a measurement is made. The signal light is polarization-wave scrambled by a polarization-wave scrambler 54, and is coupled with the excitation light by an optical coupler 55. As described above, the polarization-wave scrambling may be performed for the excitation light. Or, the polarization waves of the signal and the excitation lights may be automatically controlled so that they match or become constant.

The signal and the excitation lights coupled by the optical coupler 55 are amplified by the optical amplifier 56, and are input to the fiber to be measured 52. An FWM light is generated with the effect of the 4-wave mixing within the fiber to be measured. These three types of lights are transmitted to the receiving unit 51'. The optical coupler 61 branches the lights, from which the FWM and signal lights are extracted by the passing variable wavelength bandpass filters 62 and 64. The bandpass filters 62 and 64 are respectively controlled by the drivers 63 and 65. However, control commands are manually input. Since the transmitting unit 50' and the receiving unit 51' are separately arranged, the control signals cannot be directly input to both units. Accordingly, an operator staying on the side of the transmitting unit 50' acquires the wavelengths of the excitation and signal lights obtained by the BPF CONT 60 and the wavelength of the FWM light obtained with the above described equation 2, and notifies an operator staying on the side of the receiving unit 51' of how the bandpass filters are to be set, using a telephone line, an order wire, etc. The operator staying on the side of the receiving unit 51' manually operates a BPF CONT 120, and sets the passing bandwidths of the bandpass filters 62 and 64 to suitable values. Additionally, the values set with the BPF CONT 120 are notified to the D distribution unit 69.

The power levels of the FWM and signal lights which have passed through the bandpass filters 62 and 64 are measured by the optical power measuring units 66 and 67, respectively, and are transmitted to the η calculating unit 68. The η calculating unit 68 calculates the generation efficiency of the FWM light from the power levels obtained by the optical power measuring units 66 and 67, and notifies the D distribution unit 69 of the calculated generation efficiency. The D distribution unit 69 performs the process represented by the above described flowchart for the obtained generation efficiency η, transmits the dispersion value to the graph displaying unit 70, which is instructed to display the value as a graph, or transmits the value to the 0-dispersion wavelength displaying unit 71, which is instructed to display or print the value of the 0-dispersion wavelength $\lambda_{EO}$.

According to the second preferred embodiment shown in this figure, the measurement sequence is controlled by an operator.

Figure 13:
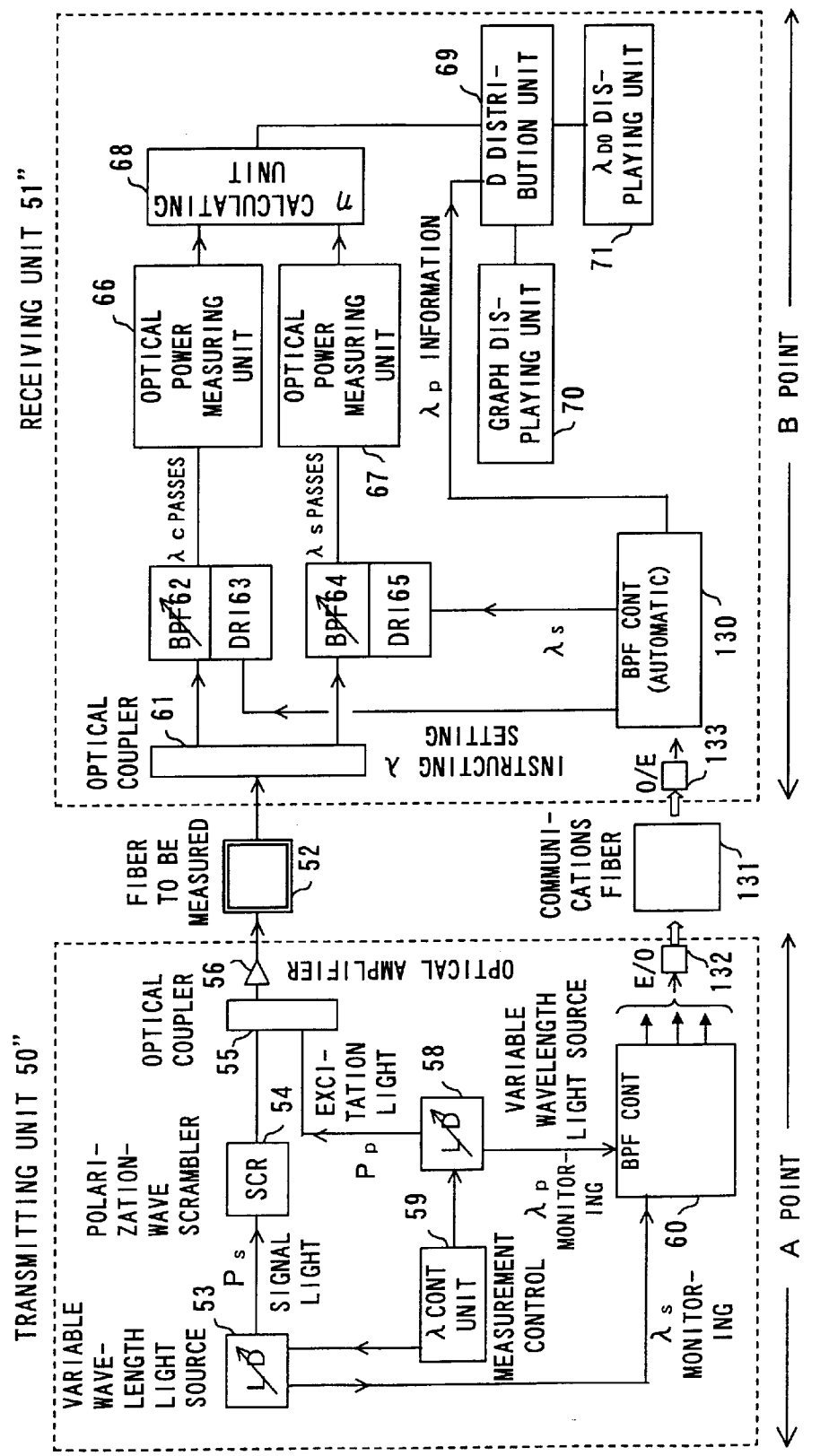
FIG. 13 is a block diagram showing the configuration of a third preferred embodiment according to the present invention.

FIG. 13 is a block diagram showing a third preferred embodiment.

In this figure, the same constituent elements as those used in the above described preferred embodiments are denoted by the same reference numerals.

FIG. 13 exemplifies the case where an input and an output of a fiber to be measured are arranged at different points. If a fiber core line exists other than the fiber to be measured, the communications line between A and B points is arranged by using the core line in order to make measurements automatic.

The wavelengths of the signal and the excitation lights set by the λ CONT 59 are obtained from the variable wavelength light sources 53 and 58, and are input to the BPF CONT 60. The wavelengths of the excitation, the signal, and the FWM lights are input from the BPF CONT 60 to an electro-optic converter 132 as electric signals, converted into an optical signal, and transmitted to an opto-electric converter 133 within a receiving unit 51" via a communications fiber 131. Then, the optical signal is converted into an electric signal by the opto-electric converter 133, and the wavelength of each signal is notified to a BPF CONT 130. The BPF CONT 130 automatically provides the drivers 63 and 65 with the control signals of the bandpass filters 62 and 64.

The other operations are the same as those shown in FIG. 12. If a communications line is secured as described above (an electric line may be used although an optical fiber is used in FIG. 13), the dispersion value and the 0-dispersion wavelength can automatically be measured by using the communications line in order to communicate control data between the BPF CONTs 60 and 130 of a transmitting unit 50" and the receiving unit 51".

Figure 14:
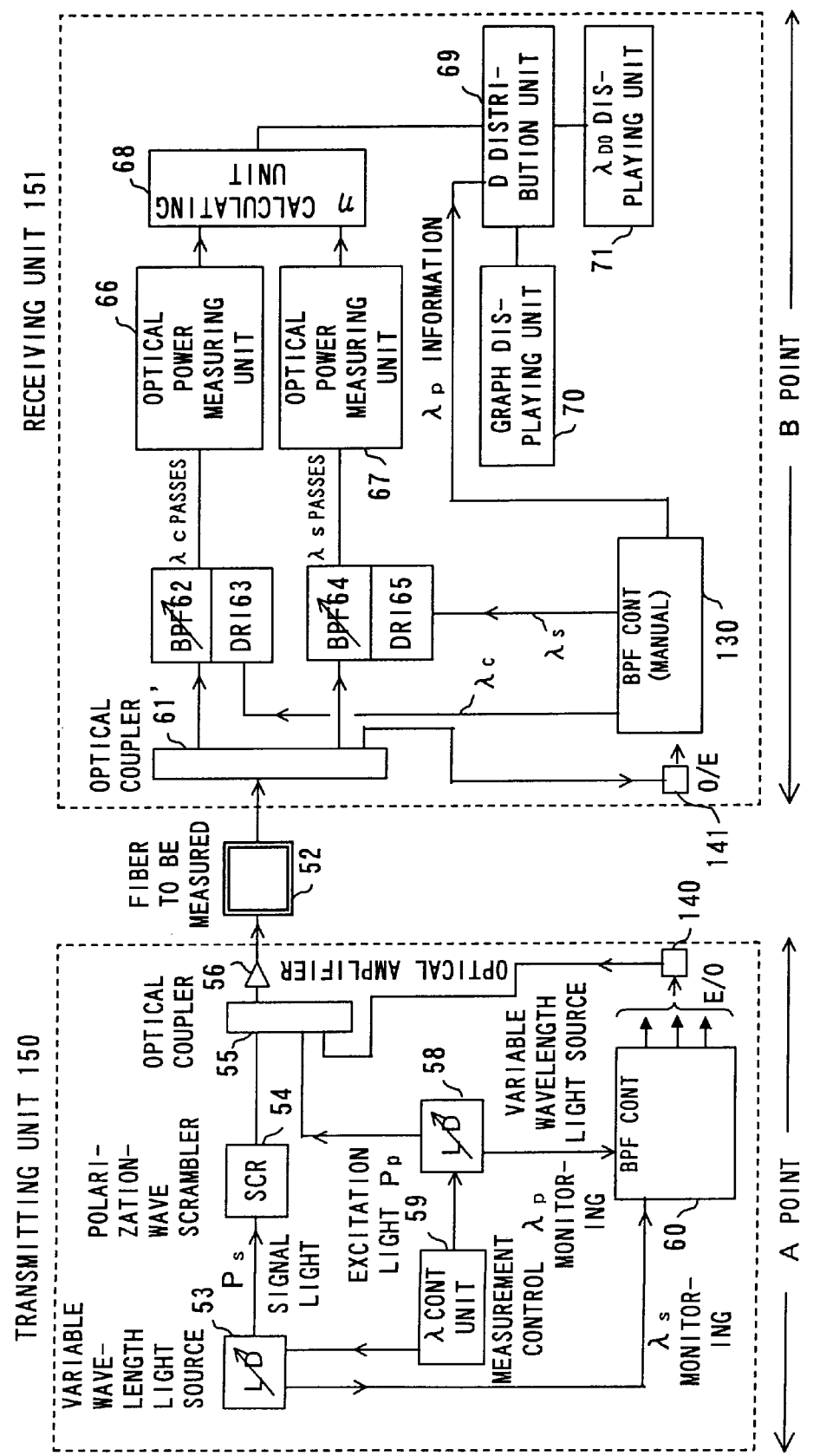
FIG. 14 is a block diagram showing the configuration of a fourth preferred embodiment according to the present invention.

FIG. 14 is a block diagram showing a fourth preferred embodiment according to the present invention. In this figure, the same constituent elements as those used in the above described preferred embodiments are denoted by the same reference numerals.

FIG. 14 exemplifies the case where an input and an output of a fiber to be measured are arranged at different points. A communications line adopting optical wavelength multiplexing between both of the points is arranged for the fiber to be measured, so that the fiber is automatically measured.

The information about the wavelengths of the excitation, signal, and FWM lights, which are obtained as electric data signals by the BPF CONT 60, are converted into optical signals by an electro-optic converter 140, wavelength-multiplexed by an optical coupler 55 with wavelengths different from those of the excitation, the signal, and the FWM lights, amplified by the optical amplifier 56, and input to the fiber to be measured 52. The optical signal output from the fiber to be measured 52 is branched by the optical coupler 61' within a receiving unit 151. The FWM and the signal lights are extracted by the bandpass filters 62 and 64, and at the same time, the optical signal from the BPF CONT 60 is branched and input to an opto-electric converter 141. The information about the excitation, the signal, and the FWM lights, which are converted into electric signals by the opto-electric converter 141, is notified to a BPF CONT 130. This information is used for setting the passing bandwidths of the bandpass filters 62 and 64 to suitable wavelength values.

As described above, the measurement of the dispersion value and the identification of the 0-dispersion wavelength can be automatically made by transmitting the information required for measurement to the receiving unit 151 over the fiber to be measured 52, even if the transmitting unit 150 and the receiving unit 151 are separately located.

Since the other portions behave in the same manner as in the above described preferred embodiments, their explanations are omitted here.

Figure 15:
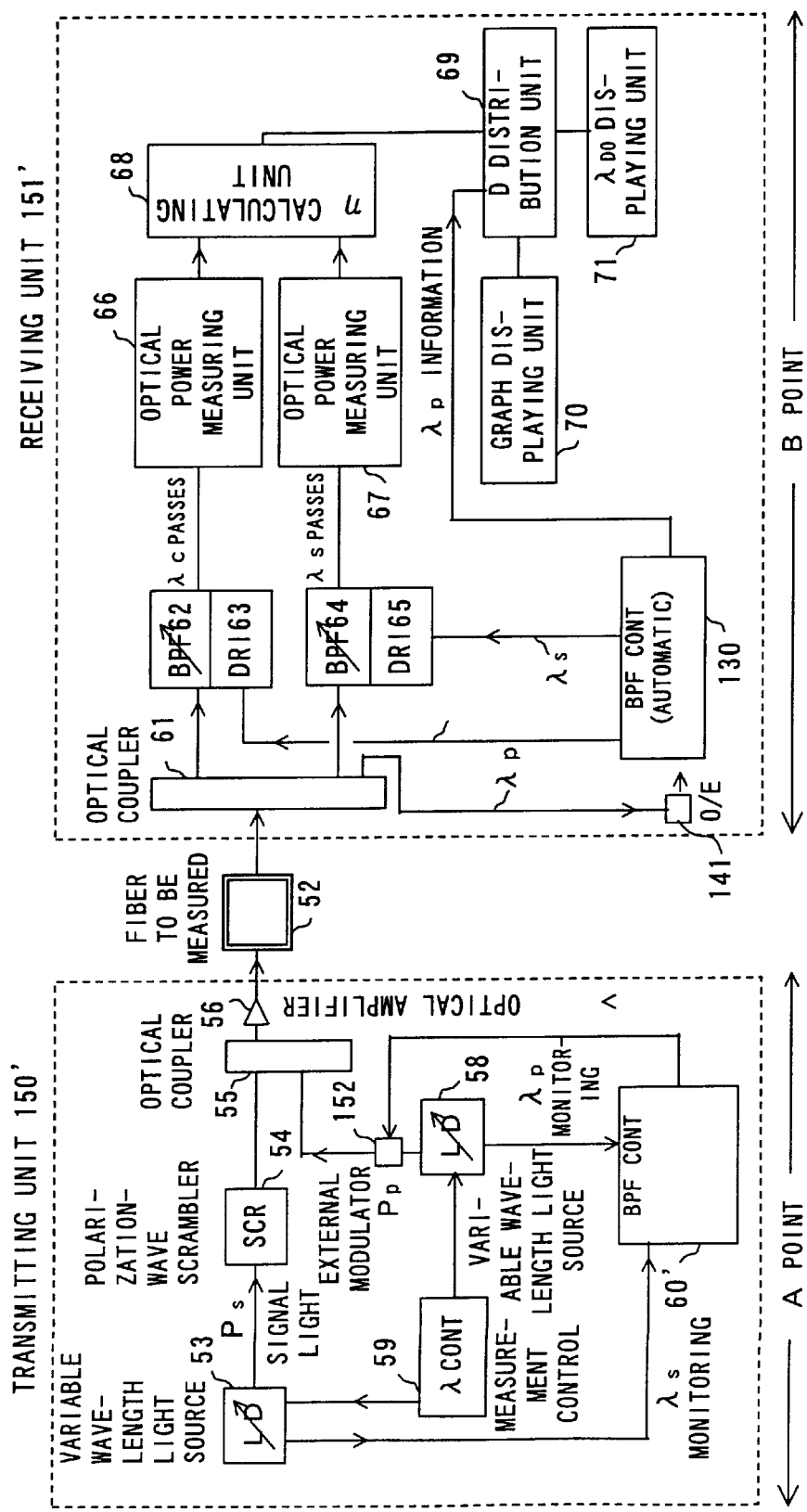
FIG. 15 is a block diagram showing the configuration of a fifth preferred embodiment according to the present invention.

FIG. 15 is a block diagram showing a fifth preferred embodiment according to the present invention.

In this figure, the same constituent elements as those used in the above described preferred embodiments are denoted by the same reference numerals.

FIG. 15 exemplifies the case where an input and an output of a fiber to be measured are arranged at different points. That is, this figure explains the method for transmitting a BPF control signal to a receiving side by modulating a signal or an excitation light.

According to the fifth preferred embodiment shown in FIG. 15, the information about the wavelengths of the excitation, the signal, and the FWM lights, which are collected by a BPF CONT 60', are transmitted to a receiving unit 151' via a fiber to be measured 52 along with the excitation light by an external modulator 152 modulating the excitation light which is a direct current light and is emitted from the variable wavelength light source 58. The signal driving the external modulator 152 is output from the BPF CONT 60'. As one example of the method with which the external modulator 152 modulates an excitation light, an intensity modulation method can be cited.

The modulated excitation light which is transmitted to the receiving unit 151' over the fiber to be measured 151' is branched by an optical coupler 61", and is converted into an electric signal by an opto-electric converter 141. A BPF CONT 130 obtains the wavelengths of the FWM and signal light by acquiring the information carried on this electric signal, controls the passing bandwidths of the bandpass filters 62 and 64, and inputs the wavelength of the excitation light to the D distribution unit 69. Note that the signal light may be modulated instead of the excitation light.

Since the other portions behave in the same manner as in the above described preferred embodiments, their explanations are omitted here.

Figure 16:
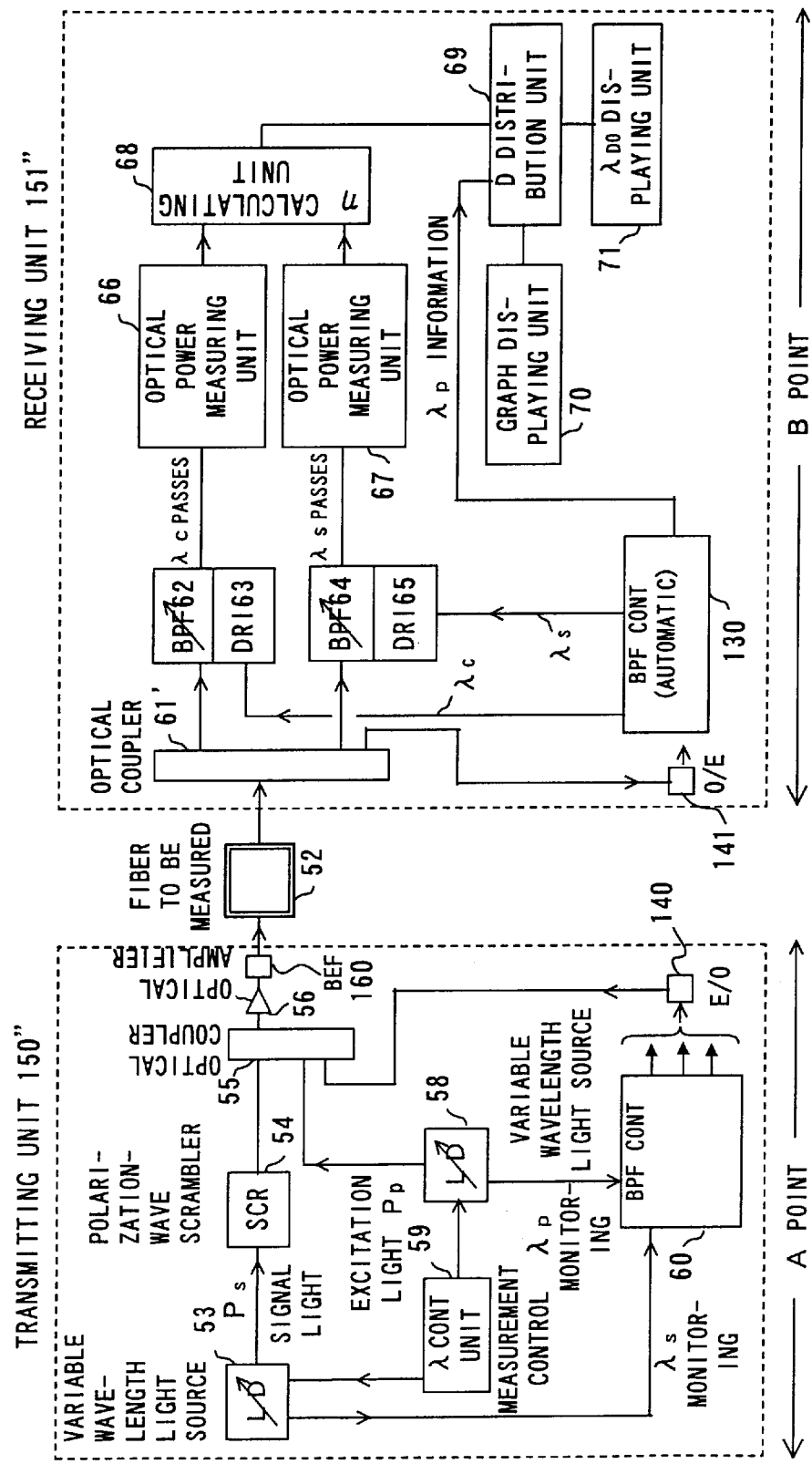
FIG. 16 is a block diagram showing the configuration of a sixth preferred embodiment according to the present invention.

FIG. 16 is a block diagram showing a sixth preferred embodiment according to the present invention.

In this figure, the same constituent elements as those used in the above described preferred embodiments are denoted by the same reference numerals.

This figure shows the method with which a BEF (Band Elimination Filter) 160 is arranged after an optical amplifier of a transmitting unit 150", and the wavelength bandwidth corresponding to λc of an ASE (Amplified Spontaneous Emission) light of the optical amplifier is eliminated.

The information about a wavelength value, etc. from the BPF CONT 60 are converted into an optical signal by the electro-optic converter 140, and then, the optical signal is wavelength-multiplexed by the optical coupler 55. This optical signal is branched by an optical coupler 61', and converted into an electric signal by the opto-electric converter 141. Its information is notified to the BPF CONT 130. The optical amplifier 56 exists at the stage succeeding the optical coupler 55, and the electric signal is amplified there. At this time, an ASE light which is noise is accumulated. Accordingly, also the FWM light occurring within the fiber to be measured 52 is superimposed on this noise, which leads to a degradation of the S/N ratio of the FWM light. If the power level of the FWM light is high, there is no problem. However, if the generation efficiency of the FWM light becomes low, its power level may not sometimes be measured by the receiving unit 151". This is because the FWM light is buried in noise even if it occurs. Therefore, the bandwidth corresponding to the wavelength of the FWM light, in which the FWM light can possibly occur, is eliminated according to the wavelengths of the signal and excitation lights. At the same time, the ASE light added by the optical amplifier 56 is removed. In such a way, the power level of the FWM light can be measured without being buried in noise even if the generation efficiency and the power level of the FWM light are low.

For the BEF, a through port such as an acousto-optic filter, etc. is used as a transmission port to a fiber to be measured, and only the light in the bandwidth desired to be eliminated may be output to a drop port. The acousto-optic filter can change the frequency of a light to be dropped by changing the frequency of an electric signal to be added. Therefore, a desired capability can be obtained by adjusting the elimination bandwidth of the BEF based on the wavelength information from the BPF CONT 60.

Since the other portions behave in the same manner as in the above described preferred embodiments, their explanations are omitted here.

According to the present invention, the configuration of the system for measuring the dispersion value or the 0-dispersion wavelength of an optical fiber transmission line can be simplified. Furthermore, the measurement apparatus can be made simpler and smaller, whereby the dispersion value or the 0-dispersion wavelength of even a currently installed fiber can be easily measured on site.

What is claimed is:

1. A wavelength dispersion measurement apparatus, comprising:
   a first light source to input to a fiber to be measured a first light having the same wavelength as a wavelength for which a dispersion value is to be measured; and
   a second light source to input a second light to the fiber to be measured, wherein
   a generation efficiency of a 4-wave mixed light that the first and the second lights generate with effects of 4-wave mixing within the fiber to be measured is measured, and a wavelength dispersion value of the fiber to be measured is determined.

2. The wavelength dispersion measurement apparatus according to claim 1, wherein the first and the second lights are unmodulated direct current lights.

3. The wavelength dispersion measurement apparatus according to claim 1, further comprising bandpass filters of a variable passing wavelength, wherein the 4-wave mixed light and the second light are extracted by controlling said bandpass filters.

4. The wavelength dispersion measurement apparatus according to claim 3, further comprising means for changing wavelengths of the first and second lights, for calculating a wavelength of the 4-wave mixed light which is generated each time the wavelengths are changed, and for automatically controlling passing bandwidths of said bandpass filters.

5. The wavelength dispersion measurement apparatus according to claim 4, further comprising:
   a transmitting unit to transmit the first and the second lights; and
   a receiving unit to receive a light passing through the fiber to be measured, wherein
   automatic measurement is made by monitoring the wavelengths of the first and second lights, by calculating the wavelength of the 4-wave mixed light, and by transmitting values of the monitored wavelengths and the calculated wavelength to said receiving unit.

6. The wavelength dispersion measurement apparatus according to claim 3, further comprising calculating means for calculating a generation efficiency ($\eta$) of the 4-wave mixed light, wherein said calculating means calculates the $\eta$ by using an equation $\eta$=–(a power level of the second light ($P_s2$)–power level of the 4-wave mixed light ($P_c1$).

7. The wavelength dispersion measurement apparatus according to claim 6, wherein losses of said bandpass filters are corrected and calculated when the $\eta$ is calculated.

8. The wavelength dispersion measurement apparatus according to claim 6, wherein wavelength dispersion of a fiber at the wavelength of the first light is determined by using the $\eta$ and information about the wavelength of the first light.

9. The wavelength dispersion measurement apparatus according to claim 6, wherein a 0-dispersion wavelength of the fiber to be measured is determined by using the $f$ and information about the wavelength of the first light.

10. The wavelength dispersion measurement apparatus according to claim 5, wherein said transmitting and receiving units are arranged at different points, and said bandpass filters of said receiving unit are manually set upon receipt of bandpass filter control information.

11. The wavelength dispersion measurement apparatus according to claim 5, wherein a bandpass filter control signal is transmitted to said receiving unit by modulating the second light, so that an automatic measurement is made.

12. The wavelength dispersion measurement apparatus according to claim 5, wherein a bandpass filter control signal is transmitted to said receiving unit by modulating the first light, so that an automatic measurement is made.

13. The wavelength dispersion measurement apparatus according to claim 5, wherein a bandpass filter control signal is input to the fiber to be measured, with optical wavelength multiplexing, and is transmitted to said receiving unit.

14. The wavelength dispersion measurement apparatus according to claim 5, further comprising an electro-optic converter and an opto-electric converter, wherein a bandpass filter control signal is transmitted to said receiving unit by using a communications line which is different from the fiber to be measured, so that an automatic measurement is made.

15. The wavelength dispersion measurement apparatus according to claim 5, wherein an optical amplifier and a band elimination filter are arranged after the first and the second lights are coupled, and noise in a bandwidth corresponding to a wavelength bandwidth of the 4-wave mixed light is eliminated from among noise generated by the optical amplifier, within said transmitting unit.

16. The wavelength dispersion measurement apparatus according to claim 1, wherein the wavelength of the first light and a wavelength dispersion value of that wavelength are obtained, so that a wavelength dispersion distribution graph of the fiber to be measured is represented.

17. The wavelength dispersion measurement apparatus according to claim 1, wherein the dispersion value of the fiber to be measured is determined based on characteristics indicating a relationship between a wavelength interval between the first and the second lights and the generation efficiency of the 4-wave mixed light, and a relationship with the wavelength dispersion value of the fiber to be measured, at that time.

18. The wavelength dispersion measurement apparatus according to claim 1, wherein a measurement range of a power of light which has passed through the fiber to be measured is changed depending on whether the wavelength of the second light is set either to a value in the vicinity of a 0-dispersion wavelength or to a value within a high dispersion area.

19. The wavelength dispersion measurement apparatus according to claim 1, wherein when a high dispersion area is measured, the dispersion value of the fiber to be measured is measured by making a wavelength interval between the first and the second lights narrower.

20. The wavelength dispersion measurement apparatus according to claim 1, wherein the wavelength of the first light that maximizes the generation efficiency of the 4-wave mixed light, which does not depend on a wavelength interval between the first and the second lights, is obtained as a 0-dispersion wavelength.

21. A wavelength dispersion measurement method, comprising the steps of:

inputting to a fiber to be measured a first light having the same wavelength as a wavelength for which a dispersion value is to be measured; and inputting a second light to the fiber to be measured, wherein a generation efficiency of a 4-wave mixed light that the first and the second lights generate with effects of 4-wave mixing within the fiber to be measured is measured, and a wavelength dispersion value of the fiber to be measured is determined.

22. The wavelength dispersion measurement method according to claim 21, wherein the first and the second lights are unmodulated direct current lights.

23. The wavelength dispersion measurement method according to claim 21, further comprising the steps of:

changing wavelengths of the first and second lights; and calculating a wavelength of the 4-wave mixed light which is generated each time the wavelengths are changed.

24. The wavelength dispersion measurement method according to claim 23, wherein in the step of calculating the generation efficiency (1) of the 4-wave mixed light, the $\eta$ is calculated by using an equation $\eta$=–(a power level of the second light ($P_s1$)–power level of the 4-wave mixed light ($P_c1$).

25. The wavelength dispersion measurement method according to claim 24, wherein wavelength dispersion of a fiber at the wavelength of the first light is determined by using the $\eta$ and information about the wavelength of the first light.

26. The wavelength dispersion measurement method according to claim 24, wherein a 0-dispersion wavelength of the fiber to be measured is determined by using the η and information about the wavelength of the first light.

27. The wavelength dispersion measurement method according to claim 21, wherein the wavelength of the first light and a wavelength dispersion value of that wavelength are obtained, so that a wavelength dispersion distribution graph of the fiber to be measured is represented.

28. The wavelength dispersion measurement method according to claim 21, wherein the dispersion value of the fiber to be measured is determined based on characteristics indicating a relationship between a wavelength interval between the first and the second lights and the generation efficiency of the 4-wave mixed light, and a relationship with the wavelength dispersion value of the fiber to be measured, at that time.

29. The wavelength dispersion measurement method according to claim 21, wherein when a high dispersion area is measured, the dispersion value of the fiber to be measured is measured by making a wavelength interval between the first and the second lights narrower.

30. The wavelength dispersion measurement method according to claim 21, wherein the wavelength of the first light that maximizes the generation efficiency of the 4-wave mixed light, which does not depend on a wavelength interval between the first and the second lights, is obtained as a 0-dispersion wavelength.

* * * * *

UNITED STATES PATENT AND TRADEMARK OFFICE
CERTIFICATE OF CORRECTION

PATENT NO. : 6,154,273
DATED : November 28, 2000
INVENTOR(S) : Suzuki

It is certified that error appears in the above-identified patent and that said Letters Patent is hereby corrected as shown below:

Column 17,
Line 11, change "($P_52$)" to -- ($P51$) --; and
Line 25, change "$f$" to -- $\eta$ --.

Column 18,
Line 55, change "(1)" to -- ($\eta$) --; and
Line 58, after ($P_51$)-" insert -- $\alpha$ --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*